(12) United States Patent
Todd et al.

(10) Patent No.: US 7,805,583 B1
(45) Date of Patent: Sep. 28, 2010

(54) METHOD AND APPARATUS FOR MIGRATING DATA IN A CLUSTERED COMPUTER SYSTEM ENVIRONMENT

(75) Inventors: Stephen J. Todd, Shrewsbury, MA (US); Steven M. Blumenau, Holliston, MA (US); Zoran Cakeljic, Newton, MA (US); Donagh Buckley, Banteer (IE); Conor Fox, Co. Cork (IE); John Philip Bell, II, Clonakilty (IE)

(73) Assignee: EMC Corporation, Hopkinton, MA (US)

( * ) Notice: Subject to any disclaimer, the term of this patent is extended or adjusted under 35 U.S.C. 154(b) by 1388 days.

(21) Appl. No.: 10/421,500

(22) Filed: Apr. 23, 2003

(51) Int. Cl.
G06F 12/00 (2006.01)
G06F 13/00 (2006.01)
(52) U.S. Cl. ................... 711/162; 711/161
(58) Field of Classification Search .......... None
See application file for complete search history.

(56) References Cited

U.S. PATENT DOCUMENTS

| | | | |
|---|---|---|---|
| 5,544,347 A | 8/1996 | Yanai et al. | |
| 5,548,711 A | 8/1996 | Brant et al. | |
| 5,680,640 A | 10/1997 | Ofek et al. | |
| 5,742,792 A | 4/1998 | Yanai et al. | |
| 5,822,531 A | 10/1998 | Gorczyca et al. | |
| 5,870,545 A | 2/1999 | Davis et al. | |
| 5,896,548 A | 4/1999 | Ofek | |
| 6,058,054 A | 5/2000 | Islam et al. | |
| 6,065,077 A | 5/2000 | Fu | |
| 6,078,990 A | 6/2000 | Frazier | |
| 6,108,748 A | 8/2000 | Ofek et al. | |
| 6,145,066 A | 11/2000 | Atkin | |
| 6,161,218 A | 12/2000 | Taylor | |
| 6,173,377 B1 | 1/2001 | Yanai et al. | |
| 6,216,202 B1 | 4/2001 | D'Errico | |
| 6,233,607 B1 * | 5/2001 | Taylor et al. | ............. 709/217 |
| 6,240,486 B1 | 5/2001 | Ofek et al. | |
| 6,266,784 B1 | 7/2001 | Hsiao et al. | |

(Continued)

FOREIGN PATENT DOCUMENTS

WO WO 01/98889 12/2001

(Continued)

OTHER PUBLICATIONS

Blunden M., et al., Storage Networking Virtualization What's it all about, Dec. 2000 IBM Redbooks.

(Continued)

*Primary Examiner*—Mardochee Chery
(74) *Attorney, Agent, or Firm*—Muirhead and Saturnelli, LLC

(57) ABSTRACT

Methods and apparatus for performing a data migration in a clustered computer system. In one aspect, the availability of the data being migrated is maintained during the migration. In another aspect, a data set is migrated by a transfer utility in one of the hosts in the cluster, and in response to a failure of the host, the migration is resumed without restarting from the beginning point of the data set. In a further embodiment, the hosts in the cluster have agents associated therewith to manage the data migration, and prior to taking at least one action associated with the data migration, the agents coordinate to ensure that the hosts in the cluster are prepared to have the at least one action taken.

38 Claims, 12 Drawing Sheets

U.S. PATENT DOCUMENTS

| | | | |
|---|---|---|---|
| 6,356,977 | B2 | 3/2002 | Ofek et al. |
| 6,367,075 | B1 | 4/2002 | Kruger et al. |
| 6,370,626 | B1 | 4/2002 | Gagne et al. |
| 6,434,637 | B1 | 8/2002 | D'Errico |
| 6,523,036 | B1 * | 2/2003 | Hickman et al. ............... 707/10 |
| 6,542,909 | B1 | 4/2003 | Tamer et al. |
| 6,564,336 | B1 | 5/2003 | Majkowski |
| 6,598,134 | B2 | 7/2003 | Ofek et al. |
| 6,598,174 | B1 * | 7/2003 | Parks et al. .................... 714/6 |
| 6,631,477 | B1 | 10/2003 | LeCrone et al. |
| 6,640,278 | B1 | 10/2003 | Nolan et al. |
| 6,665,812 | B1 | 12/2003 | Blumenau et al. |
| 6,691,245 | B1 | 2/2004 | DeKoning |
| 6,704,838 | B2 | 3/2004 | Anderson |
| 6,760,828 | B1 | 7/2004 | Black |
| 6,874,046 | B1 | 3/2005 | LeCrone et al. |
| 2002/0052941 | A1 | 5/2002 | Patterson |
| 2002/0056031 | A1 | 5/2002 | Skiba et al. |
| 2002/0133737 | A1 | 9/2002 | Novick |
| 2002/0133746 | A1 | 9/2002 | Chen et al. |
| 2003/0009707 | A1 | 1/2003 | Pedone et al. |
| 2003/0014523 | A1 * | 1/2003 | Teloh et al. ................. 709/226 |
| 2003/0115434 | A1 | 6/2003 | Mahalingam et al. |
| 2003/0188218 | A1 * | 10/2003 | Lubbers et al. ................ 714/5 |
| 2003/0217119 | A1 * | 11/2003 | Raman et al. ............... 709/219 |
| 2003/0229764 | A1 * | 12/2003 | Ohno et al. ................. 711/147 |
| 2004/0024975 | A1 * | 2/2004 | Morishita et al. ........... 711/147 |
| 2004/0034628 | A1 | 2/2004 | Numao et al. |
| 2004/0139237 | A1 | 7/2004 | Rangan et al. |
| 2004/0148486 | A1 * | 7/2004 | Burton ....................... 711/202 |
| 2004/0215845 | A1 | 10/2004 | Davani et al. |

FOREIGN PATENT DOCUMENTS

| | | |
|---|---|---|
| WO | WO 02/03203 | 1/2002 |

OTHER PUBLICATIONS

Khattar R., "Introduction to Storage Area Network, SAN", Aug. 1999, IBM.

The American College Dictionary, Copyright 2002, Houghton Mifflin Company Fourth Edition, p. 1038.

Pabst, Thomas, "Fast and inexpensive—Promise's FastTrak66 IDE RAID-Controller." Mar. 29, 2000. Tom's Hardware http://.tomshardware.com/storage/20000329/fastrak66-02.html>.

Patterson, David A. et al. "A Case for Redundant Arrays of Inexpensive Disks (RAID)", ACM 0-89791-268-3/88/0006/0109, 1998, pp. 109-116.

"Promise Milestone." 2005 http://www.promise.com/company/about/prms_milestone_eng.asp.

"Redundant array of independent disks." Wikipedia: The Free Encyclopedia. Nov. 10, 2005 <http://en.wikipedia.org/wiki/Redundant_array_of_inexpensive_disks>.

* cited by examiner

US 7,805,583 B1

METHOD AND APPARATUS FOR MIGRATING DATA IN A CLUSTERED COMPUTER SYSTEM ENVIRONMENT

FIELD OF THE INVENTION

This invention relates generally to the field of computer systems, and more particularly to methods and apparatus for migrating data in a clustered computer system environment.

DESCRIPTION OF THE RELATED ART

Many computer systems include one or more host computers, and one or more storage systems that store data used by the host computers. An example of such a computer system including host computers 1a-b and two storage systems 3 and 4 is shown in FIG. 1.

The storage systems 3, 4 include a plurality of disk drives (5a-5b or 6a-6b) and a plurality of disk controllers (7a-7b or 8a-8b) that respectively control access to the disk drives. A plurality of storage bus directors (9, 10) control communication with host computers 1a-b over communication buses (17, 18). Each storage system 3, 4 further includes a cache 11, 12 to provide improved storage system performance. In particular, when one of the host computers 1a-b executes a read from one of the storage systems 3, 4, the storage system may respond to the read from its cache 11, 12 (when the data is stored in the cache), rather than from one of the disk drives 5a-5b or 6a-6b, to execute the read more efficiently. Similarly, when one of the host computers 1a-b executes a write to one of the storage systems 3, 4, corresponding storage bus directors 9,10 can perform the write to the cache 11, 12. Thereafter, the data can be de-staged asynchronously in a manner transparent to the host computer 1a-b, to the appropriate one of the disk drives 5a-5b, 6a-6b. Finally, storage systems 3, 4 include internal buses 13, 14 over which storage bus directors 9, 10, disk controllers 7a-7b, 8a-8b and caches 11, 12 communicate.

Each of the host computers 1a-b includes a processor 16a-b and one or more host bus adapters 15a-b that each controls communication between the processor 16a-b and one of the storage systems 3, 4 via a corresponding one of the communication buses 17, 18. It should be appreciated that rather than a single processor 16 a-b, each host computer 1a-b can include multiple processors. Each bus 17, 18 can be any of a number of different types of communication links, with the host bus adapter 15a-b and storage bus directors 9, 10 being adapted to communicate using an appropriate protocol for the communication buses 17, 18 coupled therebetween. For example, each of the communication buses 17, 18 can be implemented as a SCSI bus with the directors 9, 10 and adapters 15a-b each being a SCSI driver. Alternatively, communication between the host computers 1a-b and the storage systems 3, 4 can be performed over a Fibre Channel fabric.

Typically, the storage systems 3,4 make storage resources available to the host computer for assignment to entities executing on the host, such as a file system, database manager or logical volume manager. If the storage systems are so-called "dumb" storage systems, the storage resources made available to the host computer will correspond in a one-to-one relationship to physical storage devices within the storage systems. However, when the storage systems are intelligent storage systems, they present "logical volumes" of storage to the host computer that need not correspond to a single physical storage devices within the storage system, as the intelligent storage systems may map each logical volume of storage presented to the host across one or more physical storage devices or portions thereof.

Administrators of computer systems like that depicted in FIG. 1 often find it desirable to migrate a set of logically related data, such as a database or file system, from one storage location to another, such as from storage system 3 to storage system 4. One reason for this may be that a data set is expanding at such a rate that it will soon exceed the storage capacity of a device. Other common reasons include the administrator's desire to move the data set to a device with faster response time, to physically relocate the data to one or more other devices to facilitate faster access on those devices, to establish a different disk striping scheme for fault tolerance and/or performance purposes, and/or to optimize the geographic location where the data set is physically stored. This list is not exhaustive, as there may be many other reasons to migrate a data set.

Data migrations are often complex and problematic exercises for several reasons. First, administrators usually must take any applications which access the data offline. Depending on the size of the data set (which usually determines the time required to move it), applications can be offline for lengthy periods, leading to a loss of productivity and opportunity cost associated with not having the data available to support business functions. Second, a single data migration often consists of a number of smaller data migrations, since a data set is typically broken into subsets dispersed across a number of "source" devices. These subsets need to be moved to a number of "target" devices, often requiring significant coordination. Third, data migrations usually require a substantial amount of manual labor, and are therefore error-prone, costly and involve redirecting resources from other functions to the migration.

A clustered computer system environment is one in which multiple host computers (e.g., servers) share access to one or more logical volumes on one or more storage systems. For example, referring to FIG. 1, the illustrative system would be considered a clustered environment if the host computers 1a-b both shared access to at least one logical volume presented by either of the storage systems 3, 4. The reference to a logical volume being shared refers to the two or more host computers both having access to the same logical volume. For example, if the host computers 1a-b had access to only different logical volumes in the storage systems 3, 4, the computer system would not be considered a clustered environment.

Aspects of the present invention are related to performing the migration of a shared volume or data set in a clustered environment.

SUMMARY OF THE INVENTION

One illustrative embodiment is directed to a method for performing a data migration in a clustered computer system including at least two hosts and at least one storage system that stores data shared by the hosts, the at least one storage system providing a plurality of storage volumes to the hosts to store data shared by the at least two hosts, the plurality of storage volumes including at least one first storage volume and at least one second storage volume. The method comprises acts of: (A) migrating data from the at least one first storage volume to the at least one second storage volume, the at least one first storage volume being allocated to at least one application program installed on each of the at least two hosts in the clustered computer system to store data written by the at least one application program; and (B) maintaining the at least one first storage volume available to the at least one application program so that write operations from the at least one application program can be performed to the at least one first storage volume during the act of migrating. Another embodiment is directed to at least one computer readable medium encoded with instructions that, when executed, perform the method.

Another illustrative embodiment is directed to a first host computer for managing a migration of data in a clustered computer system including a plurality of host computers and at least one storage system that stores the data, the plurality of host computers including the first host computer, wherein the data is shared by instances of at least one application executing on the plurality of host computers, the at least one storage system providing a plurality of storage volumes to the hosts to store the data shared by the plurality of host computers, the plurality of storage volumes including at least one first storage volume and at least one second storage volume. The first host computer comprises a processor to execute at least one instance of the at least one application program; and a controller adapted to take over management of the migration of the data set from the at least one first storage volume to the at least one second storage volume in the event that while maintaining the at least one first storage volume available to the at least one application program so that write operations from the at least one application program can be performed to the at least one first storage volume during the act of migrating.

A further illustrative embodiment is directed to a method for performing a data migration in a clustered computer system including first and second host computers and at least one storage system that stores data shared by the first and second host computers, the at least one storage system providing a plurality of storage volumes to the first and second host computers to store data shared by the first and second host computers, the plurality of storage volumes including at least one first storage volume and at least one second storage volume. The method comprising acts of: (A) migrating a data set from the at least one first storage volume to the at least one second storage volume using a transfer utility implemented by the first host computer, the at least one first storage volume being allocated to at least one application program installed on each of the first and second host computers to store data written by the at least one application program, wherein the act of migrating starts at a beginning point of the data set and progresses to an end point of the data set; and (B) in response to a failure of the first host computer, resuming the migration of the data set without restarting from the beginning point of the data set. Another embodiment is directed to at least one computer readable medium encoded with instructions that, when executed, perform the method.

Another illustrative embodiment is directed to a clustered computer system comprising: a first host computer comprising a first transfer utility; a second host computer comprising a second transfer utility; and at least one storage system that is coupled to the first and second host computers and stores data shared by the first and second host computers, the at least one storage system providing a plurality of storage volumes to the first and second host computers to store the data shared by the first and second host computers, the plurality of storage volumes including at least one first storage volume and at least one second storage volume. The first host computer comprises a first agent to begin a migration of a data set from the at least one first storage volume to the at least one second storage volume using the first transfer utility, wherein the first agent begins the migration at a beginning point of the data set and proceeds toward an end point of the data set. The second host computer comprises a second agent that, in response to a failure of the first host computer, resumes the migration of the data set without restarting from the beginning point of the data set.

A further illustrative embodiment is directed to a method of managing a data migration of a data set in a clustered computer system including at least first and second host computers and at least one storage system that stores data shared by the first and second host computers, the at least one storage system providing a plurality of storage volumes to the first and second host computers to store data shared by the first and second host computers, the plurality of storage volumes including at least one first storage volume and at least one second storage volume, wherein the first and second host computers respectively have first and second agents associated therewith to manage the data migration. The method comprises an act of: (A) prior to taking at least one action associated with the data migration, coordinating between the first and second agents to ensure that the first and second host computers both are prepared to have the at least one action taken. Another embodiment is directed to at least one computer readable medium encoded with instructions that, when executed, perform the method.

A further illustrative embodiment is directed to a first agent for use in a clustered computer system including at least first and second host computers and at least one storage system that stores data shared by the first and second host computers, the at least one storage system providing a plurality of storage volumes to the first and second host computers to store data shared by the first and second host computers, the plurality of storage volumes including at least one first storage volume and at least one second storage volume, wherein the first agent is associated with the first host computer and the second host computer has a second agent associated therewith, the first agent for managing a data migration of a data set from the at least one first storage volume to the at least on second storage volume. The first agent comprises at least one processor that is programmed to, prior to taking at least one action associated with the data migration, coordinate with the second agent to ensure that the second host computer is prepared to have the at least one action taken.

DETAILED DESCRIPTION

Figure 1:
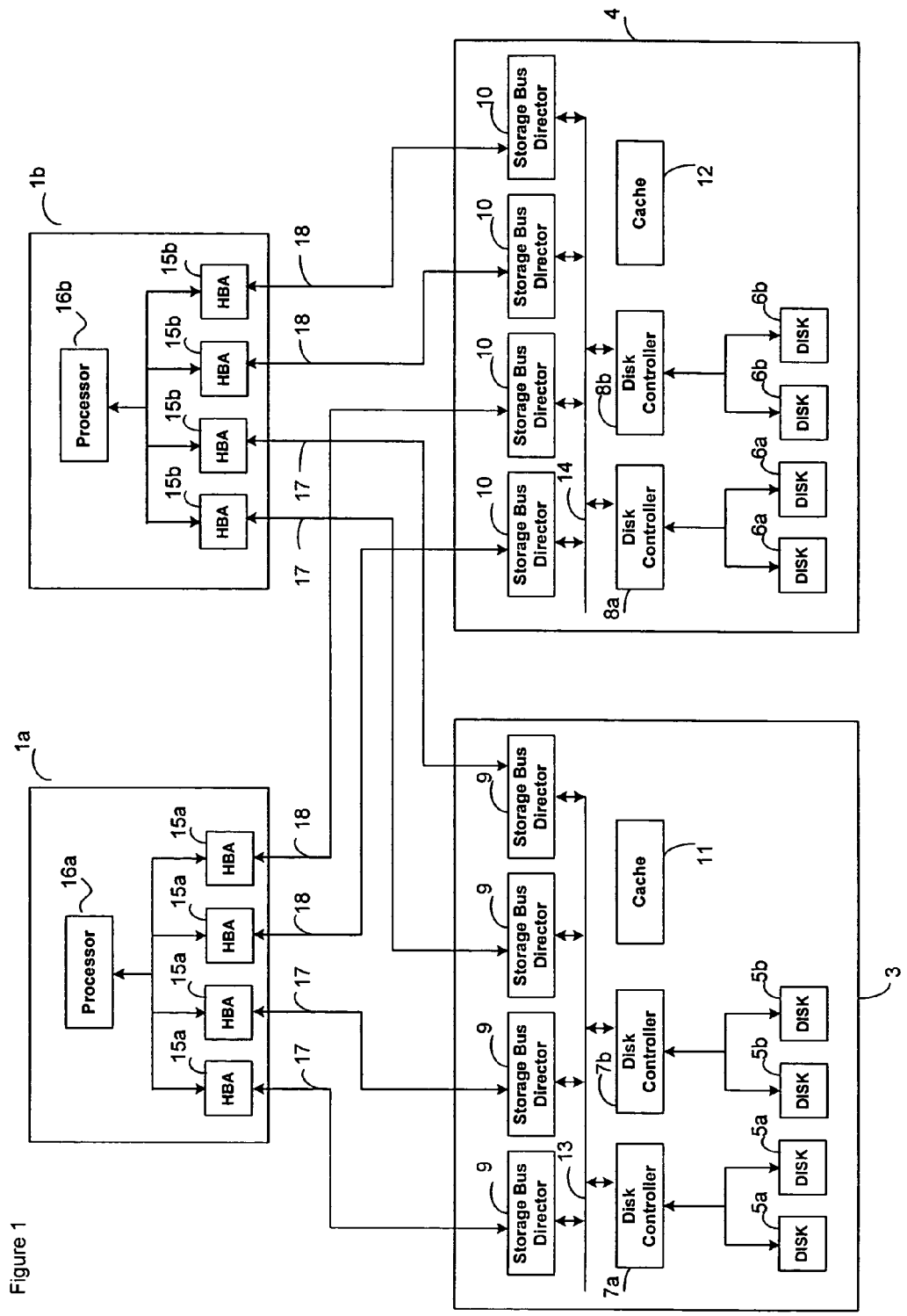
FIG. 1 is a block diagram of a clustered computer system configuration on which aspects of the present invention can be implemented.

In commonly assigned co-pending patent application Ser. No. 10/315,472, entitled "Method and Apparatus for Managing Migration of Data in A Computer System", filed Dec. 10, 2002 (hereafter "the data mobility application"), which is hereby incorporated herein by reference, techniques are described for managing a migration in a computer system. However, that previously filed application does not discuss the performance of a migration in a clustered environment. Several embodiments of the present invention are directed to methods and apparatus for migrating data in a clustered computer system environment.

In accordance with one embodiment, aspects of the present invention can be employed with migrations in which the shared data set being migrated (e.g., copied or moved) in the clustered environment need not be taken offline during or after the migration. Such a migration can occur "in the background" while normal application processing proceeds. An example of a technique for performing an on-line migration in a non-clustered environment is described in commonly assigned co-pending application Ser. No. 10/122,556, entitled "Method and Apparatus for Managing Access to Volumes of Storage," which is incorporated herein by reference. In one embodiment described therein, after the migration is complete, I/O requests are automatically "redirected" from the source locations of the migration to the target locations, so that the I/Os access data in its new location. This can be done transparently to the applications that access the data, so those applications need not be taken offline. This technique is mentioned herein only as an example, as the aspects of the present invention applicable to on-line migrations in a clustered environment can be employed with any on-line migration technique.

In accordance with another embodiment of the invention, a tool is provided to control migration processes in a clustered environment. As noted above, data migrations can often be costly and error-prone exercises. One reason for this is that migrations can be "black box" processes, whose results can only be verified after completion, and which, after initiation, can only either proceed to completion or be aborted. There is typically no opportunity to control a migration while it is in progress. Accordingly, one embodiment of the invention provides the ability to control a data migration in progress in a clustered environment.

In accordance with another embodiment of the present invention, multiple agents, respectively associated with the multiple host computers that share access to a data set being migrated in a clustered environment, communicate among themselves to manage the migration.

In a further embodiment of the present invention, a method and apparatus is provided that is fault-tolerant, such that during the migration of a shared data set in a clustered environment, the failure of one or more host computers that access the shared data set being migrated is not fatal to the migration, as the migration can be completed without having to start over again in response to the failure.

In accordance with various embodiments of the present invention, any and/or all of the numerous capabilities provided in the above-referenced earlier-filed data mobility application can be employed in a clustered environment. Among these features is the ability to pause and restart a migration. This can be advantageous for several reasons. First, if overall system performance suffers because a migration occupies an inordinate amount of processing resources, the migration can be paused and restarted at a more opportune time (e.g., during off-hours). Second, an administrator might pause a migration, adjust one or more parameters defining its execution, and restart it. Thus, if the migration is proceeding in an undesired manner, it can be adjusted midstream.

Another feature supported in accordance with one embodiment of the present invention is the ability to regulate the impact the migration has on overall performance of the clustered computer system. This regulation may be accomplished in numerous ways. In one example, because a data set being migrated may comprise multiple data segments dispersed across multiple storage resources (e.g., physical devices and/or storage volumes, as discussed below), a migration may comprise movement of data between multiple discrete source/target pairs, and the regulation of the migration's impact on system performance may be accomplished by providing a maximum number of simultaneously active source/target pair transfers. In this embodiment, each source/target pair may be initially processed all at once, but once the maximum number of transfers has been reached, the remaining pairs may be queued so that the transfer of data does not begin for the queued pairs until one or more of the previous transfers are complete. Other embodiments may provide the ability to regulate the migration's impact on system performance by limiting the total amount of data being transferred at once, the amount of data transferred at once by an individual transfer vehicle (e.g., a particular host), or using other measures. In one embodiment, regulation parameters may be adjusted while the migration is in progress to speed it up or slow it down as circumstances dictate. For example, a user may increase the total amount of data that can be transferred at once to accelerate a migration during business off-hours.

In another embodiment, the resources assigned to a migration in a clustered environment can be controlled by assigning a processing "priority" to the migration. The priority may define how processing resources on the host(s) are assigned to the migration in relation to other processes. In this manner, a migration can be expedited by assigning it a higher priority, or if the migration is not a high priority it can be processed in a manner that minimizes the impact on system resources. In one embodiment, the priority may be adjusted while a migration is in progress.

In another embodiment, the ability is provided to "undo" or revert from a migration of a shared data set in a clustered environment. In this respect, and as discussed above, it should be appreciated that migrations are often prone to error. Occasionally, errors are not detected until after the data set has actually been moved, the system has been reconfigured and the applications that access the data set have been brought back on line. Unfortunately, using conventional techniques, by the time errors are detected, it is often too late to undo the migration and revert back to a known good state for the system. In accordance with one aspect of the present invention, such a capability is provided for a shared data set in a clustered environment.

In certain computer system configurations, numerous migration methods (i.e., transfer vehicles) may exist for transferring data between one or more source/target pairs. These include, but are not limited to, host-based procedures, storage system-based procedures (e.g., hardware mirroring facilities), and networking component-based procedures. Applicants have appreciated that it may be desirable to employ different migration methods for different source/target pairs in a single migration session. Thus, unlike conventional migrations which are limited to one migration method to move the entire data set, one embodiment of the invention provides the ability to choose different migration methods for source/target pairs in a same shared data set in a clustered environment. The migration method for each source/target pair can be specified by a user, or, in one embodiment, the system can automatically pick a migration method for one or more source/target pairs. The choice of a migration method (by a user or automated process) can be made based on any of numerous factors. For example, the selection may seek to minimize the impact on system performance, by utilizing certain data transfer utilities when possible (e.g., a storage-to-storage hardware mirror facility, or an LVM replication capability).

In one embodiment, the migration of a data set, which can be any collection of data whether logically related (e.g., a file, database, file system or other collection of data) or not, is managed by creating a migration "session," through which the migration of data for each source/target pair is facilitated. Each source and target may comprise any of numerous types of storage resources, such as a LUN, a "disk" presented by a storage system, a physical storage device, a logical volume presented by a logical volume manager (LVM) or some other storage resource. The correspondence between sources and targets need not be one-to-one, as data on a source volume may be transferred to multiple targets, and the data from multiple sources may be transferred to a single target.

In one embodiment, the ability is provided to initiate a migration upon the occurrence of a predefined event. A predefined event may comprise a predetermined time interval, start time, or other event. In addition, a migration may involve the movement of data from one location to another, or the copying of data to another location. For example, a migration may be initiated to produce one or more copies of a data set at predefined intervals, so that "point-in-time" snapshots of the data set are created. Such snapshots may be useful for error recovery, to enable more efficient distributed access to the data set, or to satisfy other needs.

I. Clustered Configurations

Clustered computer system environments can be classified generally into two different types—active/passive and active/active.

In an active/passive configuration, only one server (or host) in the cluster is active at any point in time, and can be considered to be the primary or master server. Thus, although one or more other servers also may share access to one or more volumes with the master server, they are passive, such that only one server is actually accessing the data at any particular point in time.

In an active/passive configuration, the servers typically have clustering software loaded thereon that manages the clustered environment. For example, the clustering software may use heartbeat or polling techniques to allow one or more passive servers to monitor the status of the active server. If it is detected that the active server has failed, the clustering software can then cause a passive server to take over the functions of the active server.

An example of an active/passive clustered configuration can include a web server environment, wherein two or more web servers can be arranged in a clustered configuration, but with only one of the web servers active. If the active web server fails, the clustering software can cause a passive server to take on the address of the active server, such that the passive server can step in and take over the functions of the active server. In this manner, the passive servers provide fault tolerance for the system configuration.

It should be appreciated that the passive servers in an active/passive configuration need not be entirely dormant when operating in passive mode, as they can perform numerous other processing functions, and may only be passive with respect to the volumes of storage that are shared in the clustered configuration.

In an active/active clustered configuration, multiple servers are active and can simultaneously access one or more storage volumes. An example of an active/active configuration is a shared database environment, such as the Oracle parallel server product available from Oracle Corporation. In an active/active configuration, the clustering software communicates (via a TCP/IP communication session or otherwise) to ensure that two servers are not writing to the same data locations at any particular point in time (e.g., by placing locks on ranges of data blocks being written or otherwise).

II. Coordination Between Multiple Migration Agents

In the above-referenced data mobility application, a technique is described wherein a migration is controlled in a non-clustered environment by a data mobility agent. In a clustered environment, wherein multiple hosts share access to a data set being migrated, one embodiment of the present invention employs multiple agents that communicate to coordinate the migration, to ensure that problems are not encountered due to the availability of the data set to multiple hosts.

One embodiment of the present invention can support a clustered computer system environment that employs multiple data migration transfer methods. These data transfer methods can be broadly broken down into two classifications, i.e., host-based and SAN (storage area network) based. Host-based transfer methods are performed by one or more of the host devices that access the data set in the clustered environment. SAN-based data transfer methods are performed outside of the servers, such as by a switch in the network or by the storage systems themselves (e.g., using a remote data facility such as the SYMMETRIX remote data facility (SRDF) available from EMC Corporation). The reference herein to the data transfer method being "SAN-based" is used in a convenient shorthand manner to refer to any storage system or network-based transfer method, and is not limited to utilities on networks conventionally referred to as storage area networks. For example, the transfer utility could be implemented by any of numerous other types of networks, including a local area network (LAN) or a wide area network (WAN).

As will be discussed in more detail below, different issues are encountered when performing a migration in a clustered environment that is active/passive versus one that is active/active, and different issues are encountered depending upon whether the mobility transfer method is host-based or SAN-based. Thus, the following four configurations are possible, and each will be discussed separately below: (1) active/passive clustered environment with a host-based migration transfer method; (2) active/passive clustered configuration with a SAN-based transfer method; (3) active/active clustered configuration with a host-based transfer method; and (4) active/active clustered configuration with a SAN-based transfer method.

As discussed above, in one embodiment a migration in a clustered environment is controlled by multiple data mobility agents associated with the clustered host computers. The data mobility agents may be software-based, and may execute on the host computers that share access to the data in the clustered environment or on other devices in the computer system. However, the invention is not limited in this respect, as the agents may comprise any suitably adapted hardware and/or software-based component(s). In one embodiment, an agent employs one or more application programming interfaces (APIs) which allow it to communicate with, and control the functions of, various external utilities as discussed below. For example, APIs may allow an agent to invoke a host-based copy procedure or any other transfer method supported by the computer system on which the migration occurs. APIs may also be provided which allow external entities to control the agent's functions. For example, in one embodiment, at least one of the agents in the cluster may communicate with a management tool, such as the Control Center/Open Edition suite offered by EMC Corporation (hereinafter the ECC management tool), which may perform complementary functions to those described herein, including determining the various source locations at which a given body of data resides, provisioning target devices to store the data being migrated and configuring network equipment to enable secure data transmission during the migration. However, the present invention is not limited in this respect, as the agents can control, and be controlled by, other processes in numerous other ways.

In one embodiment, instructions that define a migration are presented to at least one of the mobility agents in the clustered environment in the form of a data structure which provides operational parameters for the migration session and each source/target pair. The characteristics and function of an illustrative data structure are discussed in detail below.

In one embodiment, at least one of the agents utilizes a data repository to store and retrieve data related to the migration session. The repository may provide data useful for ascertaining the states of various entities involved in a migration, for recovering from system malfunctions, and other purposes. The repository may be a database, file, or other data set (i.e., a collection of data), and need not be centralized in a single store. In one embodiment, the repository may only be accessed and/or updated by one or more mobility agents, but the invention is not limited in this regard, as other embodiments may provide for repository access and/or update by other processes executing on the system.

III. Active/Passive Cluster with Host-Based Copy

One embodiment of the present invention directed to performing a migration in an active/passive clustered environment using a host-based transfer method will now be described, referring to FIG. 2. As shown therein, the clustered environment employs an active host 201 and a passive host 203 that each share access to a storage volume 205 provided on storage system 207. The storage system 207 is coupled to the host computers 201, 203 via a network 209. Each of the host computers 201, 203 includes clustering software 211 that communicates (as illustrated at 213) to implement the clustered environment. The communication 213 can take any of numerous forms, including either direct communication between the host computers 201, 203, or via the network 209. In this respect, it should be appreciated that the aspects of the present invention described herein are not limited to use with any particular type of clustered environment or any particular type of clustering software. Furthermore, although in the illustrative examples described herein the cluster includes two host computers that share access to the storage volume 205, and it should be appreciated that all the embodiments of the present invention described herein are not so limited, and can be employed in clusters including three or more host computers.

In the embodiment illustrated in FIG. 2, the host computers 201, 203 have mobility agents 215, 217 (respectively) that implement aspects of the present invention described below. As will be described in more detail, the mobility agents 215, 217 communicate between them, as illustrated conceptually at 219. As with the communication between the clustering software components 211, the communication 219 can be performed in any of numerous ways, as the present invention is not limited to any particular communication technique. For example, the mobility agents 215, 217 may communicate via the network 209.

Figure 2:
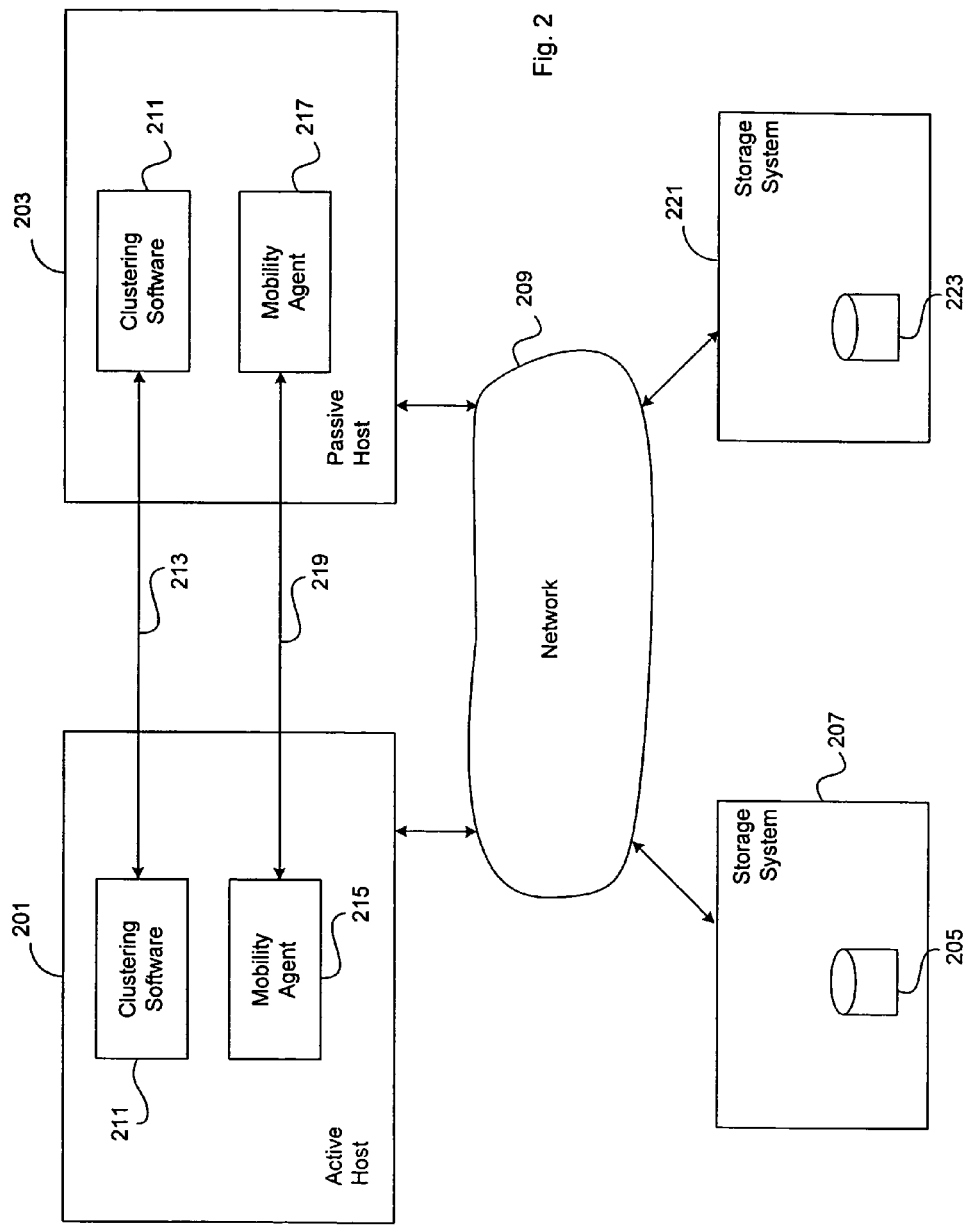
FIG. 2 is a block diagram of an exemplary clustered computer system employing mobility agents to facilitate the data migration of a shared volume in accordance with one embodiment of the present invention.

Finally, the computer system shown in FIG. 2 also includes a storage system 221 that includes a target volume 223 to which the source volume 205 is to be migrated. It should be appreciated that the aspects of the present invention described herein are not limited to the migration of a single volume, as numerous source/target pairs of volumes can be involved in the migration of a data set as described in more detail below. Furthermore, although the source 205 and target volumes 223 are illustrated in the system of FIG. 2 as being disposed on different storage systems, the present invention is not limited in this respect, as the source(s) and target(s) could be provided on a single storage system.

A. The Data Structure

In accordance with one embodiment of the present invention, a migration session is begun by the creation of a data structure that includes parameters specified therein that define the migration and are submitted to at least one of the mobility agents 215, 217.

The data structure may be created based on a user's input to any suitably adapted input facility (e.g., a GUI, command line interface, or other input tool). While a data structure may serve as one of the primary modes of communication between user and mobility agent, the invention is not limited in this respect as other communication/input tools may be employed. In accordance with one embodiment of the present invention, the data structure is defined by a user interface associated with a management utility (e.g., the above-discussed ECC management tool), and is submitted to at least one of the mobility agents 215, 217. As will be appreciated below, in one embodiment of the present invention, the migration data structure is distributed to all of the mobility agents in the clustered environment. This distribution can be accomplished in any of numerous ways, as the present invention is not limited to any particular implementation technique. For example, the management tool can provide the migration data structure to each of the mobility agents directly, or the management tool could provide the migration data structure to one of the mobility agents (e.g., the one associated with the active host), and the mobility agent could then distribute it to the other mobility agents in the cluster.

In one embodiment, the mobility data structure identifies each of the servers in the clustered environment because, as discussed below, various aspects of the present invention rely upon communication between the servers (and/or their mobility agents), such that it is advantageous for each of the mobility agents to be aware of the mobility agents in each of the other servers in the cluster. In addition, in accordance with one embodiment of the present invention, the migration data structure initially provided to the mobility agents identifies the clustered configuration as active/passive, as the mobility agents will take various actions (as discussed in more detail below) based upon whether the configuration is active/passive or active/active. Furthermore, the mobility data structure initially provided may also specify that the transfer method is host-based, as this impacts actions taken by the mobility agent as will be discussed in more detail below.

In one embodiment, a separate data structure defines the parameters for each migration session. Of course, the invention is not limited in this respect, as a single data structure could provide parameters for multiple migration sessions.

In one embodiment, the data structure provides not only parameters for an overall migration session, but also separate parameters for individual source/target pairs. As discussed above, a migration session may comprise the movement of data between a number of discrete source/target pairs. Thus, providing separate parameters for each source/target pair allows an administrator to specify different migration methods for each source/target pair, ascertain the individual status of each source/target pair, and otherwise separately control and monitor individual source/target pairs. However, the invention is not limited in this regard, as separate parameters need not be provided for all individual source/target pairs. Furthermore, a migration session may comprise a single source/target pair.

The data structure may take any desirable form (e.g., relational structure, hierarchical structure, flat file, object-oriented or other form).

Figure 3:
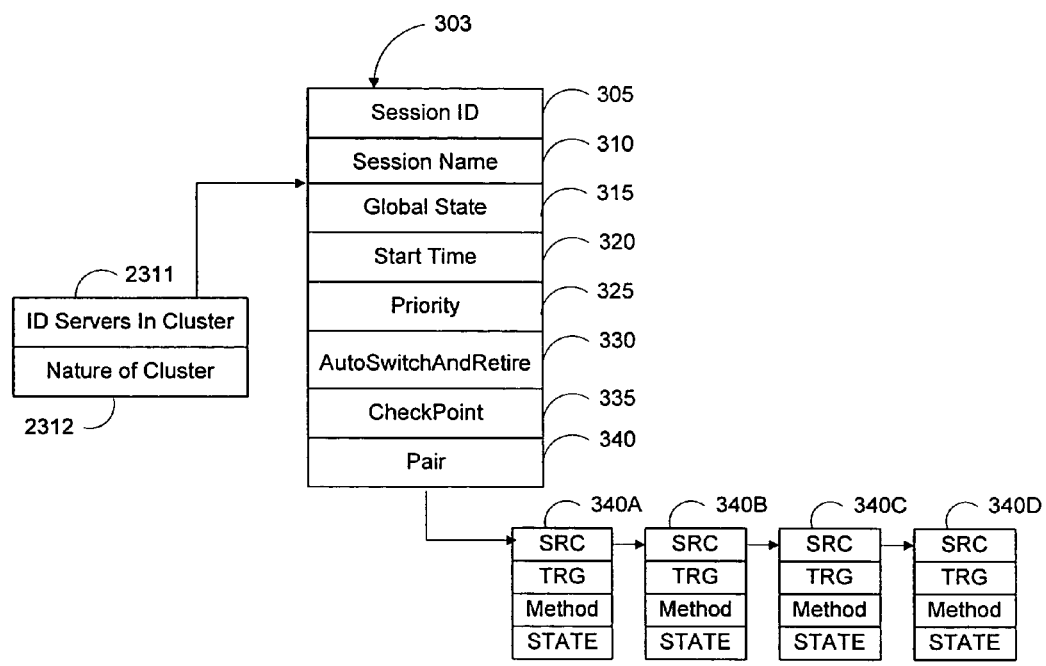
FIG. 3 depicts a data structure employed by one embodiment of the invention to supply migration session parameters and state information.

An illustrative form for the data structure is depicted in FIG. 3. As discussed in more detail below, this data structure serves the dual purpose of providing input to the agents to control aspects of a migration session, and also allows the agents to provide status regarding a previously initiated migration session. In this respect, in one embodiment, when an agent receives the data structure, it loads the migration parameters provided therein into its data repository. When the agent is queried to determine the status of an ongoing migration session, in one embodiment the agent recreates the data structure based on the most current data in its repository, and returns the updated data structure (e.g., to the user interface). It should be appreciated, however, that the invention is not limited to employing the same data structure as an input to and output from the agent, as different structures may be used for these purposes. Also, the particular fields and format of the data structure shown in FIG. 3 are merely illustrative, as the invention is not limited in this respect.

Referring to FIG. 3, the data structure 303 includes a session ID 305, which is an identifier for the migration session. The session ID may be an alphanumeric string, although it is not limited to any particular format. The identifier performs several functions. First, it creates a logical entity to which a number of underlying source/target pairs can be related. Second, it allows each migration session to be tracked independently, even after completion. Third, it attaches a unique identity to each migration session, so that if multiple migration sessions proceed simultaneously, each can be uniquely identified and coordinated separately. The identifier may be assigned by any entity in the computer system that can ensure the creation and assignment of unique identifiers for each migration session. For example, where the computer system includes a management tool (such as the above-discussed ECC management tool), the identifiers may be assigned by that management tool. Alternatively, in a system which includes multiple agents, one agent may be assigned to function as a "master" to assign session identifiers for the system, or any other entity may be chosen to perform this function.

The data structure 303 also includes a session name 310 that is a descriptor for the migration session. The descriptor may be an alphanumeric string supplied by a user to associate a more descriptive user-recognizable name to the session than that provided by the session ID. For example, if a particular database is to be migrated, an administrator may use the name of that database as the session name 310. The session name eliminates the need for a user to memorize a session identifier in order to recognize a particular session, and can provide a meaningful description that facilitates recognition of what the session entails. The session name 310 may also prove especially useful in providing an enduring record of past migration sessions.

The data structure 303 also includes a field 311 that identifies the other servers and/or agents in the cluster, and a field 312 that defines the nature of the cluster as either active/passive or active/active as discussed above.

The data structure 303 further includes a global state field 315 for the migration session's global state. This field 315 may not be populated when the data structure is submitted to initiate the session, but can be used when the agent presents the data structure to report on the status of the session. As discussed below, in the embodiment of FIG. 3, the agent ascertains the state (i.e., status) of each source/target pair migration. If queried about the status of the overall migration session, the agent may aggregate source/target pair status indications to determine a global state for the migration session. The aggregation and characterization of global state may be performed in any of a number of ways, as the invention is not limited in this respect. Examples of the migration status types that can be provided in the global status field 315 are discussed below.

The data structure 303 also stores an indication of the start time 320 of the migration session. In one embodiment, this reflects when the agent received the request to begin the migration. This indication may be useful in numerous ways. For example, the start time indication may allow the agent to calculate the duration of an ongoing migration session. This may be useful for limiting a migration session to a certain maximum elapsed time. Using this capability (e.g., in conjunction with the priority indicator discussed below), a user may prevent a migration session from occupying system resources over an extended period, keep a session from exceeding a predetermined time window (e.g., if a user wants a migration to process only during non-business hours), or otherwise control the timing of the migration. The start time indication may also be useful in resolving conflicts between migration sessions. For example, in one embodiment discussed below, an agent may begin a migration session by first determining whether any source/target pairs comprising the session are "locked" by another session. If two migration sessions simultaneously seek to access a particular device, the conflict may be resolved by determining which migration session started earliest. The start time indication may also be useful in that it may specify a later start time for the migration. For example, an administrator might use the start time indication to specify that the migration should begin during business off-hours. The examples above are provided for illustrative purposes only, as the uses of the start time indication are not limited to those listed.

The data structure 303 also has a priority field 325 which defines the relative priority assigned to the migration session. The priority field provides input to the agent as to the amount of processing resources to be allocated to the migration session, particularly when employing a host-based transfer method. The priority/resource control can be implemented in any of numerous ways. For example, the agent may communicate directly with the host operating system to influence resource distribution. Alternatively, in one embodiment the agent uses the priority to determine the quantity of resources to take for itself by altering the resource-intensiveness of the migration process. For example, the priority may instruct the agent how long to wait between issuing transfer (e.g., copy) commands, how many memory buffers to employ, how large each buffer should be, a total duration for the migration session, or provide any other type of information that impacts resource usage. The priority may be set by a user, management tool, or other entity. In one embodiment, the priority may be modified while a migration session is in progress (e.g., by an administrator submitting an updated data structure to the agent with a modified entry in the priority field) so the user can "throttle" the migration as circumstances dictate.

The data structure 303 includes an auto-switch and retire field 330 that indicates whether the agent should perform an "auto-switch" and/or retirement at the completion of the migration session. This field is provided for use with a migration process that can automatically (i.e., without reconfiguring the host) redirect host accesses from the source to the target. An example of such a migration process is described in the above-referenced application Ser. No. 10/122,556. The embodiment of the invention that includes the auto-switch and retire field 330 is not limited to use with this particular migration process, and can be used with any migration process having this capability. Furthermore, the invention is not limited to use with migration processes having this capability, as the auto-switch and retire field is optional.

The timing of the switch to the target can be controlled by the auto-switch and retire field 330, with any of several options. For example, the field 330 can specify that the switch be performed at a predetermined time, upon a predetermined event (e.g., when the business day concludes), when the migration is completed, on an individual source/target pair basis as each pair is completed, or any other desired circumstance. The retire option relates to rendering the source location inaccessible after a switch is completed, for any number of reasons, examples of which are discussed in the above-referenced application Ser. No. 10/122,556. In one embodiment, the migration process may allow a migration to be "undone" if it was unsuccessful in some respect, so source retirement may not be desired in all circumstances. Accordingly, the auto-switch and retire field 330 may support specifying that automatic switching be performed, but that retirement not be performed.

The auto-switch indication may be initially set by a user, by a management tool, or other entity. In one embodiment, the auto-switch indication may be modified while a migration session is in progress. The auto-switch process is discussed in further detail below.

The data structure 303 further includes a checkpoint field 335 which indicates whether the agent should track the progress of the migration so that if the migration is interrupted by the failure of any component in the system, the migration can be restarted from the point of failure. This field is intended for use with a migration process that has the capability to log the state of a migration and restart it in the event of an interruption. One example of such a migration process is described in co-pending commonly assigned application Ser. No. 10/211,469, entitled "Migration Host-Based Mirroring," which is incorporated herein by reference. However, the present invention is not limited to use with this migration process, as other techniques may be employed to log the state of a migration and resume from a point of failure, and aspects of the present invention can be employed with migration techniques that do not have this capability. Use of the checkpoint field may be advantageous because it provides an administrator control over whether such logging is performed, thereby preventing the unnecessary consumption of system resources if such logging is not desired.

Finally, the data structure 303 includes one or more pair tables or fields 340A-D, each of which includes information on one of the source/target pairs in the migration session. In the embodiment shown in FIG. 3, four tables are shown and each identifies the corresponding source and target, the method to be used to move the data from the source to the target, and the state of the migration for the source/target pair. However, the invention is not limited to providing this information for any specific number of source/target pairs, as the number of tables or fields may range from one to any suitable number. Further, the invention is not limited to providing the specific information shown, as different sets of information are possible.

As discussed above, the sources and targets involved in the migration may be any of various types of storage resources, examples of which include "disks" or LUNs provided by a storage system, actual physical storage devices, and logical volumes specified by a logical volume manager (LVM). The migration method suitable for a source/target pair may depend, in part, on the types of storage resources. For example, a hardware mirroring option for LUNs from one storage system to another may only be available when the computer system on which the source and target are provided supports such a facility, and a mirroring utility provided by an LVM may only be available as the migration method when the source and target are logical volumes managed by the LVM. In one embodiment discussed below, the data structure 303 can specify the migration method for each source/target pair (e.g., it can be selected by an administrator) or the data structure can instruct the agent to choose a migration method for one or more source/target pairs.

B. Agent Operation

In one embodiment, the agents in a clustered environment perform a number of processes, including starting a migration session, pausing and restarting a migration session, canceling a migration session, facilitating auto-switching and retirement, and a wakeup process. This embodiment is merely illustrative, as the agents are not limited to performing these processes, as other implementations of the agents are possible. Similarly, although an illustrative implementation of each process is described below, the invention is not limited to these implementations, as each process can be implemented differently.

1. Starting a Migration Session

Figure 4A:
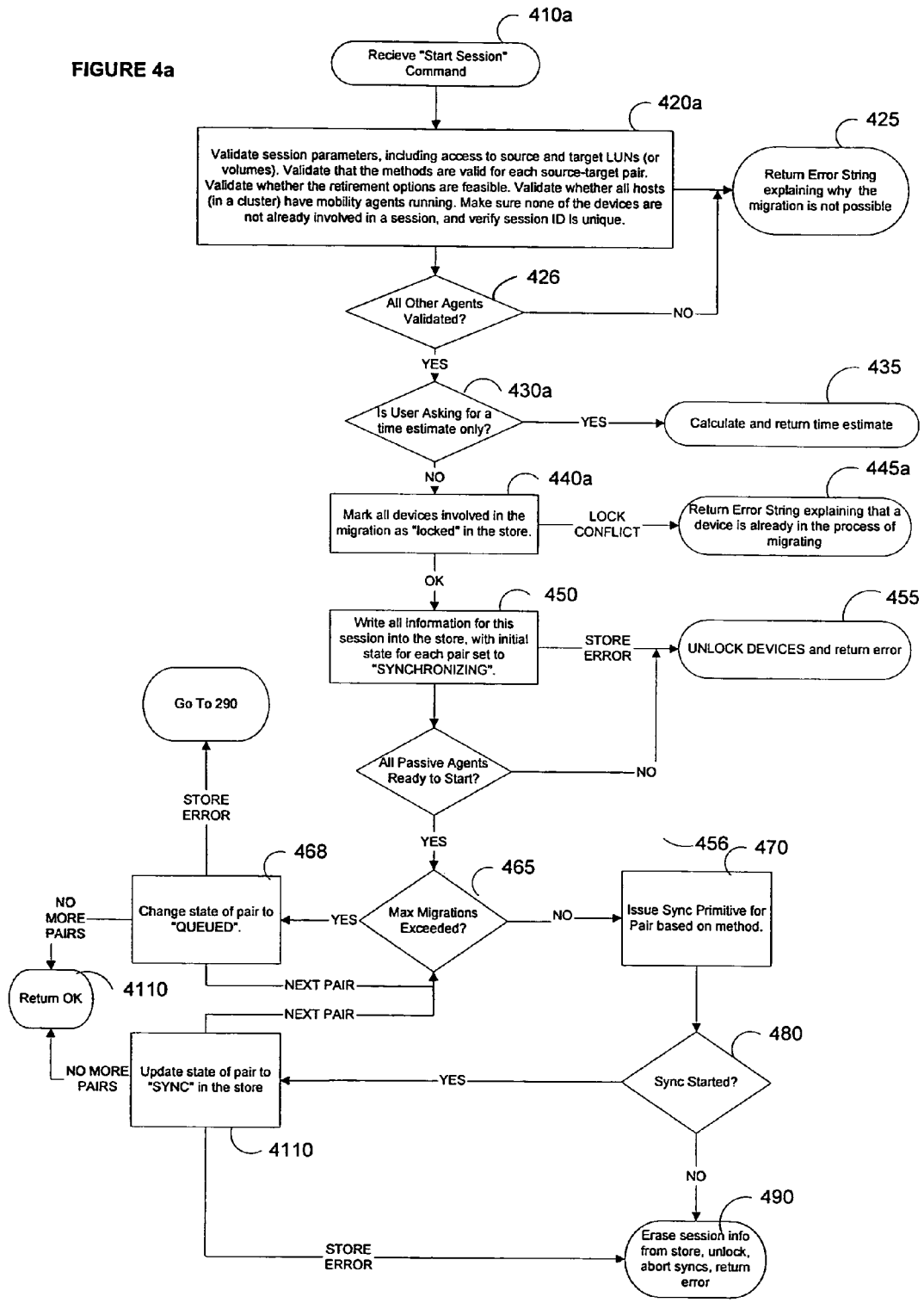
FIG. 4a is a flow diagram of a process, executed by an active host in a clustered environment, to start a migration session in accordance with one embodiment of the invention.
Figure 4B:
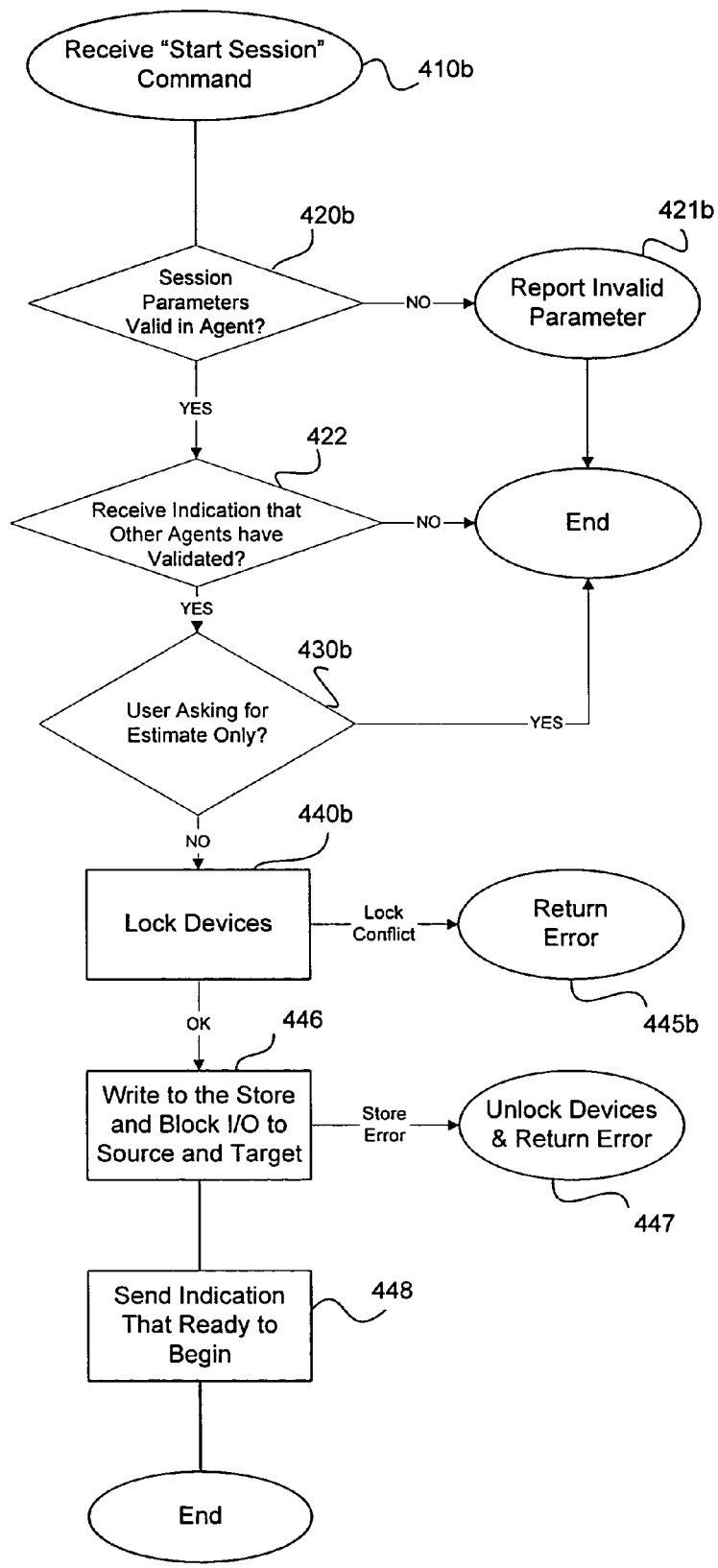
FIG. 4b is a flow diagram of a process, executed by a passive host in a clustered environment, to start a migration session in accordance with one embodiment of the invention.

Illustrative processes for initiating a migration session are depicted in FIG. 4a-b. The process illustrated in FIG. 4a is performed by the agent corresponding to the active host, whereas the process illustrated in FIG. 4b is performed by the one or more agents corresponding to the passive host.

As discussed above, in one embodiment a migration session begins when the agents receive instructions for the migration session in the form of a data structure. The data structure is provided to each agent when a "start session" command is received in acts 410a-b. The start session command can be received from a user, a management tool (e.g., the ECC management tool) or other entity.

In acts 420a-b, the processes validate the parameters provided for the migration session. The invention is not limited to validating any specific parameters, such that the specific parameter validation acts described below provide merely one example of verification that can be performed with the data structure of FIG. 3.

In acts 420*a-b*, each process validates that it can communicate with and access all named source and target volumes. This can be done in any suitable way, as the invention is not limited to any particular technique. Each process also validates the migration method specified for each source/target pair. This may be performed to ensure that the agent can invoke the migration method specified for each named source/target pair. For example, in one embodiment, a user may select a migration method (e.g., from a standard list provided by a management tool) that may not be available for a particular source/target pair. For example, a storage system-to-storage system hardware mirror facility (e.g., a remote data facility such as EMC's SRDF) may be specified as the migration method for a source/target pair, but the storage systems on which the source and target devices reside may not be equipped to execute such a facility (e.g., there may be no direct link between them).

In the embodiment of FIGS. 4*a-b*, the validation acts 420*a-b* further check the option specified in the auto-switch/retirement field 330 of FIG. 3. There are numerous ways in which a device can be retired (i.e., made unavailable for access), but various storage systems may support only a subset of such options. For example, in one embodiment, a user may specify that a source device be retired by making it "not ready" after the switch. If the source device resides on a storage system that doesn't support a "not ready" command, the validation will fail.

The validation acts 420*a-b* further check that none of the named source or target devices are currently involved in a migration session. This may be important for several reasons. For example, data on a target device could be overwritten and lost if information arrives from two different source devices. In another example, when a migration of data is intended to move data from one location to another, data on a source device should not be migrated to two different target devices. In one embodiment, this check comprises verifying that none of the sources or targets are "locked" by an ongoing migration session. The locking of devices will be discussed in further detail below. This check may be performed in a number of different ways, as the invention is not limited to any particular technique.

The validation acts 420*a-b* further check that the session ID 305 (FIG. 3) is unique. This can be done in any of numerous ways. In one embodiment, the process checks the data repository (where a listing of all session IDs is maintained) to ensure that the session identifier has not been used before.

In one embodiment, the validation acts 420*a-b* also select the migration method for any source/target pairs for which a migration method is not specifically identified. As discussed above, the data structure may specify the migration method for each source/target pair. In one embodiment, the data structure may alternatively instruct the process to pick a migration method for one or more pairs (e.g., based on the characteristics of the source and target resources). In one embodiment, the processes query each source and target device to determine the relevant characteristics thereof, and determine the most appropriate migration method based upon this information. For example, if a source/target pair includes LUNs on storage systems having a hardware mirroring facility between them, the processes may choose that migration method for the pair, but if such a hardware mirroring facility is not available, the processes may choose a host-based copy instead. In one embodiment, when the method is chosen for a source/target pair, the data structure is updated to reflect the method for the pair so that the chosen method(s) may be invoked in act 470 (described below in connection with FIG. 4*a*).

As should be appreciated from the processes in FIGS. 4*a-b*, in accordance with one embodiment of the present invention, validation steps are performed in each of the agents associated with a host in the clustered environment, to ensure that the migration requested is compatible with each of the hosts that access the data set being migrated. If the validation acts fail in any of the agents associated with the hosts in the clustered environment, the migration will not proceed. This coordination between two or more agents can be performed in any of numerous ways, as the present invention is not limited to any particular implementation in this respect. In the embodiment illustrated in FIG. 4*a*, when it is determined at act 420*a* that the validation has failed, the process illustrated in FIG. 4*a* returns an error message in act 425. The error message may take any of numerous formats. In one embodiment, the error message indicates that the migration cannot be performed as requested, and optionally states why (i.e., it identifies failed parameters). In one embodiment, the process returns an error message to the user and/or records the error message in a system log.

Similarly, when it is determined in act 420*b* that the validation fails in one of the other agents, the process proceeds to act 421*b*, wherein it reports that the validation has failed. In accordance with one embodiment of the present invention, this report is issued to the process of FIG. 4*a* executing on the agent associated with the active host. Thus, the process in FIG. 4*a* determines at act 426 whether all of the other agents have returned an indication that their validation acts have completed successfully, and when at least one has reported (e.g., in act 421*b*) that the validation failed, the process in FIG. 4*a* proceeds to act 425 to return an error as discussed above. Thus, the process illustrated in FIG. 4*a* will return an error if any of the agents associated with the hosts in the cluster fail their validation act, and will proceed only if all of the agents have validated the session parameters.

When it is determined in act 420*b* that an agent has successfully validated the session parameters locally, the process illustrated in FIG. 4*b* proceeds to act 422, wherein a determination is made as to whether all of the other agents associated with the hosts in the clustered environment have validated the session parameters, and when they have not, the process simply terminates. Conversely, when it is determined that all of the agents in the clustered environment have validated the session parameters, the process illustrated in FIG. 4*b* proceeds.

As should be appreciated from the foregoing, in the embodiment illustrated in FIGS. 4*a-b*, the agents associated with the hosts in the clustered environment are in communication to ensure that no agent proceeds to a next step in the process unless and until it is determined that all of the agents have validated the session parameters. Again, the particular manner in which this communication takes places is an implementation detail, as the present invention is not limited to any particular implementation. For example, in the embodiments illustrated in FIGS. 4*a-b*, failed session parameters are reported to the agent associated with the active host, which is the only agent that reports an error to the user. However, the present invention is not limited in this respect, as each of the other agents could alternatively be configured to return an error directly to the user when it fails the session parameter validation.

It should be appreciated that by validating session parameters before initiating a migration session, the embodiment of FIGS. 4*a-b* minimizes the chance that a migration session will begin that cannot be completed as specified, thereby avoiding a waste of resources in beginning such a session. However, it should be appreciated that the invention is not limited in this respect, and that the validation process need not be performed before beginning a migration session.

When the validation acts complete successfully, the processes proceed to acts 430 *a-b*, wherein a determination is made as to whether the user is only requesting a time estimate for the session (e.g., as specified in the data structure). If so, the process in FIG. 4*a* proceeds to act 435 wherein an estimate is calculated and returned to the user and the process terminates, and wherein the process in FIG. 4*b* simply terminates. A time estimate may be useful in helping a user schedule an appropriate time to perform a particular migration session. The time estimate can be calculated in any of numerous ways, as the invention is not limited to any particular technique. For example, in one embodiment an agent may calculate the estimate by analyzing the volume of data to be migrated, the migration methods specified for each source/target pair, the device types included, their access rates, the number of pairs comprising the session, and/or other information.

When it is determined in acts 430*a-b* that a time estimate is not requested, the processes proceed to acts 440*a-b*, wherein the agents attempt to lock all source/target pairs which comprise the migration session, thereby preventing other migration sessions from accessing those devices. Devices can be locked in any of numerous ways. In one embodiment, data can be kept in the repository used by the agent to specify devices locked by a migration session. If the attempt in act 440*a-b* to lock one or more devices fails because another migration session has already locked it, the processes proceed to acts 445*a-b* wherein an error message is returned explaining that the device(s) are currently unavailable for the migration session.

After the process of FIG. 4*b* in the passive agents has locked the devices in act 440*b*, the process proceeds to act 446, wherein the process records the migration operation and blocks input/output (I/O) operations to the source and target volume(s). The information recording the operation can be stored anywhere. In one embodiment, it is stored by updating the data structure (FIG. 3) stored in the data repository, which made reside in a persistent storage device accessible to the agent to withstand failure. Similarly, the manner in which I/O operations to the source and target pairs are blocked can be implemented in any manner, as the present invention is not limited in this respect. It should be appreciated that I/O operations to the source and target volume(s) are blocked in the agents associated with the passive hosts because in view of the fact that the transfer method is host-based, various techniques can be implemented as discussed in more detail below to ensure consistency between the source and target volume(s). As these techniques are implemented, in one embodiment of the present invention, in the active host, allowing I/O operations to occur from the passive hosts during the migration may result in inconsistencies between the source and target volume(s). Although no I/O operations should be expected from a passive host, this blocking is performed in accordance with one embodiment of the present invention as an added level of protection.

When the process is unable to write to the store or block I/O to the source and target, it proceeds to act 447, wherein the devices are unlocked, an error is returned, and the process terminates. Although not shown in FIGS. 4*a-b*, this error will cause the process in FIG. 4*a* to similarly unlock the source and target pair(s) and terminate, and will also cause any other processes 4*b* executing in the agents corresponding to the other passive hosts in the clustered environment to unblock I/O to the source and target pair(s) prior to terminating. In this respect, it should be appreciated that in each of the various processes discussed above, when an error condition occurs that results in terminating either the starting of a migration or a migration already begun, communication can take place between all of the agents in the cluster, so that each of the agents can take appropriate action, including unlocking the source and target pair(s), unblocking I/O to the source and target pair(s) if blocked, and cleaning up any data structures associated with the migration.

Once the source and target devices are successfully locked in acts 440*a-b*, the process in FIG. 4*a* proceeds to act 450 wherein the state of each source/target pair is updated. The state may be kept anywhere, and in one embodiment is stored by updating the data structure (FIG. 3) stored in the data repository, which may reside in a persistent storage device to withstand failure. In one embodiment, the state is updated to reflect that a migration request for the devices is "synchronizing". The initial "synchronizing" state indicates that the migration request has been received, but the migration for the pair has not yet been further processed as discussed below. The number of states may vary with more or less process granularity as desired. The present invention is not limited to any particular implementation in this respect. When the process is unable to successfully access or write to the storage space for the status, it proceeds to act 455, wherein the process unlocks the source and target devices, returns an error indicating that the migration was unsuccessful, and the process terminates. Although not show in FIG. 4*b*, this error also causes all of the processes of FIG. 4*b* executing in the passive agents to similarly unlock the source and target devices, unblock I/O to the source and target devices, and terminate.

When the write to the repository in act 450 succeeds, the process in FIG. 4*a* proceeds to act 456, wherein a determination is made as to whether an indication has been provided from the process of FIG. 4*b* executing in all of the passive agents that each is ready to begin the migration. These indications are sent in act 448 (FIG. 4*b*), after each agent has blocked I/O to the source and targets and has written to its store to prepare for the migration. When it is determined in act 456 that any of the passive agents has returned an error and is not ready to start, the process in FIG. 4*a* returns to act 455 to unlock the source and target devices and terminates. Conversely, when it is determined in act 456 that all of the passive agents are ready to start, the process in FIG. 4*a* proceeds to act 465, wherein it determines whether the number of currently pending source/target pair migrations exceeds a predefined maximum number. As discussed above, in one embodiment a migration request may define (e.g., in the priority field 325 of the data structure) a maximum number of active source/target pair transfers as one way to limit the processing resources expended on data migration efforts (which may encompass more than one migration session) at any one time. In one embodiment, this maximum number may be increased or decreased at any time (including while a migration session is in progress) by updating the request, and therefore the data structure which defines the session.

When it is determined in act 465 that the maximum number is not met or exceeded, the process proceeds to act 470, wherein it begins the transfer of data from the source to the target (i.e., the source and target are "synchronized") by invoking the migration method specified for the pair. The process may invoke the migration method in any number of ways. As discussed above, in one embodiment the agent is given access to the program libraries of the facilities which transfer the data, and can thus invoke the appropriate routines as needed. In other embodiments, the agent may utilize an application programming interface (API) to instruct a program executing on a host computer, storage system (e.g., storing the source or target), networking device (e.g., a switch) or other component to perform the data movement. The interface to the migration method is generically referred to in FIG. 4a as a "primitive" that is called to invoke the method. As discussed above, numerous migration methods are possible, including host-based copy (e.g., using an application on the host, a driver in the I/O stack as discussed in the above-referenced application Ser. No. 10/122,556, or the capabilities of an LVM), a storage device-based transfer (e.g., using a mirroring facility such as the Symmetrix Remote Data Facility offered by EMC Corporation), a network device-based transfer (e.g., using a utility for this purpose executing on a switch), or other data transfer utility accessible to the agent. For the purpose of the embodiment currently being described, the migration method is a host-based copy.

After the migration method primitive is called in act 470 to invoke the method, the process proceeds to act 480 wherein the process verifies that the migration method has started correctly. If a problem is encountered, the process proceeds to act 490 wherein actions are taken to halt the migration because it cannot complete as specified. For example, the process may update the data repository to reflect that the overall session is aborted. The process may also abort the ongoing synchronizations of other source/target pairs in the session, unlock each source/target pair and return an error. This reporting of an error can also cause processes on the passive agents to update their data stores, unlock the source/target pairs and unblock I/O to those pairs to similarly terminate the migration.

Although the entire session is aborted when a problem is encountered in act 480 for the above-discussed embodiment of FIG. 4a, the present invention is not limited in this regard. In another embodiment, the agent may abort only the pair in question while allowing other source/target pairs to continue, and may return a notification that the facility specified for the source/target pair in question could not be invoked. The user or process that initiated the migration may then select another migration method for the failed pair and re-attempt the migration.

When it is determined in act 480 that the synchronization has successfully begun, the process proceeds to act 4100 wherein the data repository is updated to reflect the updated state of the source/target pair in question (i.e., that the pair is synchronizing). If the update of the data repository fails for any reason, the process again proceeds to act 490 wherein actions are taken to halt the migration as discussed above.

When the update to the data repository in act 4100 succeeds, a determination is made (in act 4100) as to whether any pairs remain to be processed. When none remain, the process proceeds to act 4110, wherein it completes and returns a message indicating that it completed successfully.

When it is determined in act 4100 that more pairs remain, the process returns to act 465 where it begins to process the next source/target pair. For each source/target pair remaining in the migration session, the process determines (act 465) whether starting the pair exceeds the maximum number of migrations, and if not, the process begins the migration (act 470), validates that it has begun correctly (act 480), and updates (act 4100) the data repository to reflect that the migration has begun.

When a determination is made during processing of a source/target pair at act 465 that the maximum number of migrations is met or exceeded, the process proceeds to act 468, where the state of the pair is changed (e.g., by updating the data repository) to "queued". Pairs in this queued state will be processed at a later time by another process as discussed below with reference to FIG. 9. If the process encounters an error in updating the state of a source/target pair to queued, the process proceeds to act 490 wherein the process aborts as discussed above.

When an update succeeds at act 468, the process proceeds to the next source/target pair and returns to act 465 to determine whether the maximum number of migrations is met or exceeded. In this respect, because one or more migrations may have completed since the last time a determination was made as to whether the maximum number had been met, even if the maximum number of migrations was met or exceeded when a prior pair was processed, it may be possible for the migration of the currently processed pair to begin.

In the manner discussed above, the process loops through acts 465, 470, 480, and 4100 and/or acts 465 and 468 until all pairs have begun synchronizing or placed in a queued state, where the pair(s) await further processing as discussed below.

In one embodiment of the present invention, when the process in FIG. 4a updates its data store relating to the status of the migration (e.g., in acts 450, 468 and 4110), it sends information relating to the update to at least one of the agents (e.g., all the agents) corresponding to the passive hosts, such that at least one other agent in the cluster will have up to date information relating to the status of the migration. This is advantageous for fault recovery reasons as discussed below, wherein if the agent associated with the active host fails, an agent associated with a passive host will have sufficient information relating to the state of the migration to complete the migration without restarting from the beginning as discussed below. It should be appreciated that the present invention is not limited in this respect, as some embodiments may not support completion of a migration when the active host fails, so that the passive hosts need not have up to date status relating to the state of the migration, as the migration will simply be aborted if the active host fails. In this respect, it should be appreciated that in any of the processes discussed herein, when an agent executing the process updates the status of the migration or any of the source/target pair(s), that status update may be broadcast to at least one other agent in the system in a manner similar to that discussed above.

In accordance with the embodiments of FIGS. 4a-b described herein, the host-based copy is performed by the active agent, because the nature of the host-based copy technique employed may involve analyzing I/O operations directed to the source volume and taking appropriate actions. However, it should be appreciated that the present invention is not limited in this respect, as it may be possible to have a passive host perform the host-based copy using different techniques.

Furthermore, it should be appreciated that the aspects of the present invention employed herein directed to a clustered environment are not limited to the particular initiation routines illustrated in FIGS. 4a-b. In this respect, aspects of the present invention related to a clustered environment involve techniques for coordinating between multiple agents, and the specific actions taken by one or more agents in performing the migration are not a limitation of the present invention.

2. Initiating Migration for Queued Source/Target Pairs

As discussed above, queued pairs have not yet begun synchronizing. Thus, in one embodiment, a technique is employed whereby queued pairs are revisited to begin synchronization of those pairs.

Figure 5:
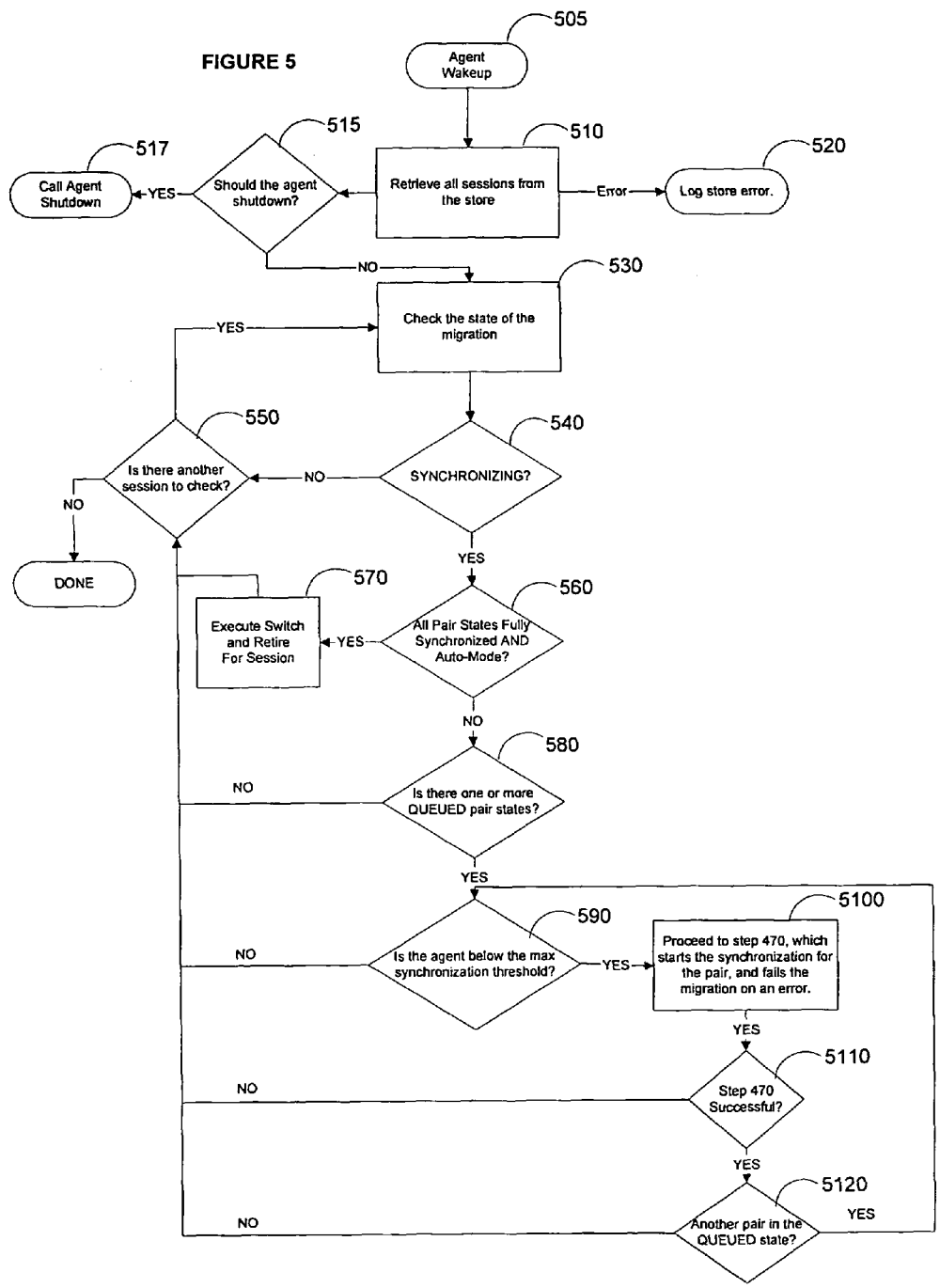
FIG. 5 is a flow diagram depicting a process executed at wakeup by a migration agent used to manage a migration process in accordance with one embodiment of the invention.

FIG. 5 depicts an illustrative embodiment of a process (which can, for example, be executed by the agent associated with the host that is performing the host-based copy) to process queued source/target pairs. The embodiment depicted is exemplary, as the invention may be implemented in a number of ways. In the embodiment depicted, the process begins at act 505 with agent wakeup. In one embodiment, it is not necessary for the agent to execute at all times, so it may be beneficial for the agent to "sleep" (i.e., be inactive) for periods so as not to occupy system resources during that time. The agent may "wake up" periodically or upon predetermined events to, for example, see if any source/target pairs have completed synchronizing so that the agent can initiate the auto-switch and retire process. In one embodiment, each time the agent awakens it executes the process of FIG. 5, to begin the migration of as many source/target pairs as possible. It should be appreciated that the invention is not limited in this respect, as the agent may never cease executing, or may otherwise not require a wakeup routine.

Agent wakeup may be triggered by any of a number of occurrences. For example, a wakeup routine may start an agent after a predetermined period of inactivity (e.g., every ten minutes), when a certain event occurs (e.g., the completion of one or more source/target pair migrations), when a user sends the agent a request (e.g., a request to shut down, or to modify one or more parameters governing a migration session), or upon any other suitable occurrence.

When the agent wakes up, in act 510 it attempts to ascertain the status of the migration session. In one embodiment, it does this by retrieving information related to the migration session from the data repository, which may have been updated by another process while the agent was asleep. As discussed above, other processes may update the repository. When the agent is unable to access the data repository, the process proceeds to act 520 wherein it returns an error (e.g., by reflecting this failure in a log) and terminates.

When the process successfully accesses the data repository in act 510, it proceeds to act 515, wherein the agent determines whether it should invoke a shutdown procedure. In one example, the agent may shut down because it has reviewed an instruction from the user to do so. In another example, the retrieval of data from the data repository may reveal that there are no sessions in progress, and therefore that there are no actions for the agent to take. When the process determines that it should shut down the agent, it proceeds to act 517 wherein it invokes a routine to shut down the agent, and terminates.

When it is determined in act 515 that the process should not shut down, the process proceeds to act 530 wherein it determines the global state of each ongoing migration session. In one embodiment, for each session selected, the agent aggregates the pair states to determine a global session state. There are numerous ways of performing this aggregation, and the invention is not limited to any particular technique. In one embodiment, if at least one source/target pair is actively synchronizing or is queued, then the global state will be set to "synchronizing" to indicate that the agent may have work to do for the session.

After the global state for the session is determined, the process proceeds to act 540, wherein a determination is made as to whether the global state of the migration session is actively synchronizing.

When it is determined that the session being processed is not actively synchronizing, the process proceeds to act 550, wherein it determines whether other sessions should be checked (i.e., whether other ongoing sessions are under its purview). If there are no others to check, the process terminates (e.g., the agent reverts back to sleep mode). When there are other sessions to check, the agent returns to act 530, wherein it begins processing a next session.

When the process determines in act 540 that the migration session has a global state of synchronizing, it proceeds to act 560, wherein it determines whether each source/target pair has been fully synchronized and the auto-switch option has been selected (e.g., from the information retrieved from the data repository in act 510). When the auto-switch option has been selected and all pairs are fully synchronized, the process proceeds to act 570 wherein it executes the auto-switch and retire process for the session. An illustrative auto-switch and retire process is described below with reference to FIG. 9.

When the process determines in act 560 that all pairs are not fully synchronized, or that the auto-switch option is not selected, the process proceeds to act 580 wherein the process determines (e.g., from the information retrieved from the data repository in act 510) whether any source/target pairs are queued. When none are queued, the process proceeds to act 550, wherein it determines whether another session should be checked in the manner discussed above.

When it is determined in act 580 that at least one source/target pair is queued, the process proceeds to act 590, wherein it determines whether the number of ongoing migrations is below the maximum. When the number of migrations ongoing is not below the maximum, the process proceeds to act 550, wherein it determines whether another session should be checked.

When it is determined at act 590 that the number of ongoing migrations is below the maximum, the process (in act 5100) proceeds to acts 470-4100 in the process of FIG. 4a, wherein the agent invokes the specified migration method for a first queued source/target pair. In acts 470-4100, the agent determines whether the synchronization has begun successfully, and if not, it aborts either the source/target pair migration or the migration session overall as discussed above.

After acts 470-4100 have completed, the process proceeds to act 5110, wherein a determination is made as to whether the migration for the processed pair was begun successfully. When it was not, the process proceeds to act 550 to determine whether another session should be checked. When it is determined in act 5110 that the migration was begun successfully, the process proceeds to act 5120 wherein it determines whether another source/target pair exists in a queued state. If so, the process returns to act 590 to process a next pair in the manner discussed above. If no more pairs exist, the process proceeds to act 550, wherein it determines whether another session should be checked.

3. Pausing a Migration Session

Figure 6:
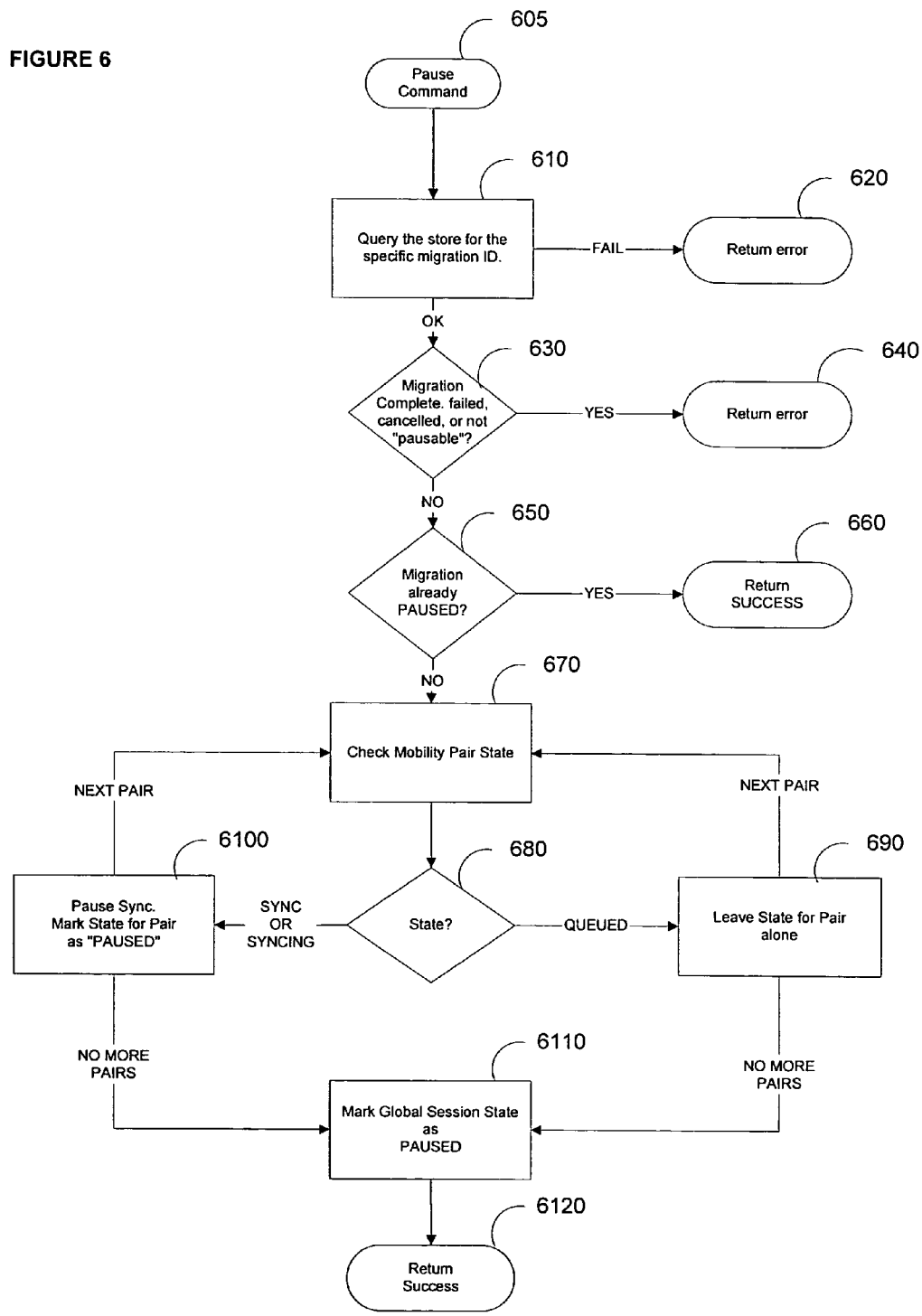
FIG. 6 is a flow diagram depicting a process used to pause a migration session in accordance with one embodiment of the invention.

As discussed above, in one embodiment the capability to pause a migration session is provided. The invention is not limited in this regard, as other implementations need not provide such a capability. FIG. 6 depicts one embodiment of a process performed by an agent (e.g., the agent associated with the host performing the host-based copy) to pause a migration session. The depicted process is merely exemplary, as other implementations are possible.

In act 605, the agent receives a pause command. The pause command might be issued by a number of different entities and for a number of different reasons. For instance, a user might issue a pause command if the migration session is occupying an inordinate amount of processing resources, causing other system operations to proceed too slowly. Without the benefit of a pause command, a user would be forced to abort the migration entirely (thereby sacrificing progress already made), or allow it to continue despite the undesired impact on system performance. The pause capability provides greater flexibility and control over the migration and its impact on system performance.

When the pause command is received by the agent, in act 610 the process retrieves information related to the migration session (e.g., from the data repository). When that retrieval is unsuccessful, the process proceeds to act 620 wherein it returns an error (e.g., by returning an error message to the user and/or recording an error message in a system log).

When information related to the session is successfully retrieved, the process proceeds to act 630, wherein the agent ascertains whether the migration is in progress and can be paused. Conditions which may prevent a session from being paused include its having already completed, failed or having been canceled. In addition, a session may not be pause-able if it utilizes (at least in part) a migration method which cannot be paused (e.g., some hardware mirroring facilities may not permit pausing). However, the invention is not limited in this respect. In one embodiment, if the process determines that one or more pairs cannot be paused but others can, it will pause those pairs that it can. When the process determines in act 630 that the session cannot be paused, the process proceeds to act 640, wherein it returns an error.

When the process determines in act 630 that the migration session can be paused, it proceeds to act 650, wherein it ascertains whether the migration has already been paused. If it has already been paused, the process returns a message in act 660 indicating successful pausing of the session.

When it is determined in act 650 that the migration has not already been paused, the process proceeds to acts 670 and 680, wherein it checks the state for a first source/target pair in the migration session. The source/target pairs may be chosen in any order using any method. When it is determined that the chosen source/target pair is actively synchronizing (i.e., its state is "sync") or that a request has been received to synchronize the pair but actual data transfer has not yet begun (i.e., its state is "synchronizing"), the process goes to act 6100 wherein it pauses the migration method used for that pair and updates the data repository to reflect that the pair is paused. The pair may be paused in any of numerous ways, which may depend on the migration method used for the pair. It should be appreciated that a pause-able method should provide the capability to determine at what point in the migration the pause command was received, so that the migration can be restarted from that point. After the pair is paused, the process determines (in act 6100) whether any pairs remain. If so, the process goes to the next pair and returns to act 670.

When it is determined in act 680 that the source/target pair is queued, the process proceeds to act 690 wherein the agent leaves the state of the pair unchanged, since there is no migration activity to pause. The process then determines (in act 690) whether any pairs remain and, if so, goes to the next pair and returns to act 670.

When it is determined in either act 6100 or 690 that all applicable pairs have been processed, the process proceeds to act 6110, wherein it updates the data repository to reflect the global state for the migration session as paused. The process then proceeds to act 6120, wherein it returns a message (e.g., to the user and/or in a system log) that the pause has completed successfully.

In one embodiment, a migration session may be paused more than once. This may be useful in that it may provide for scheduling migration activities during periods of light system activity. For example, a migration executing at night can be paused when the business day begins, restarted (as discussed below) at lunchtime, paused again in the afternoon, then restarted in the evening. This scenario is merely exemplary, as the number of times that a migration session may be paused is unlimited.

In accordance with one embodiment of the present invention, when the process of FIG. 6 updates the state of the migration or of any of the pairs (e.g., in act 6100 and 6110), the agent can communicate this update to each of the other agents in the cluster, so that each can have a consistent status of the migration for reasons discussed above.

4. Restarting a Migration Session

Figure 7:
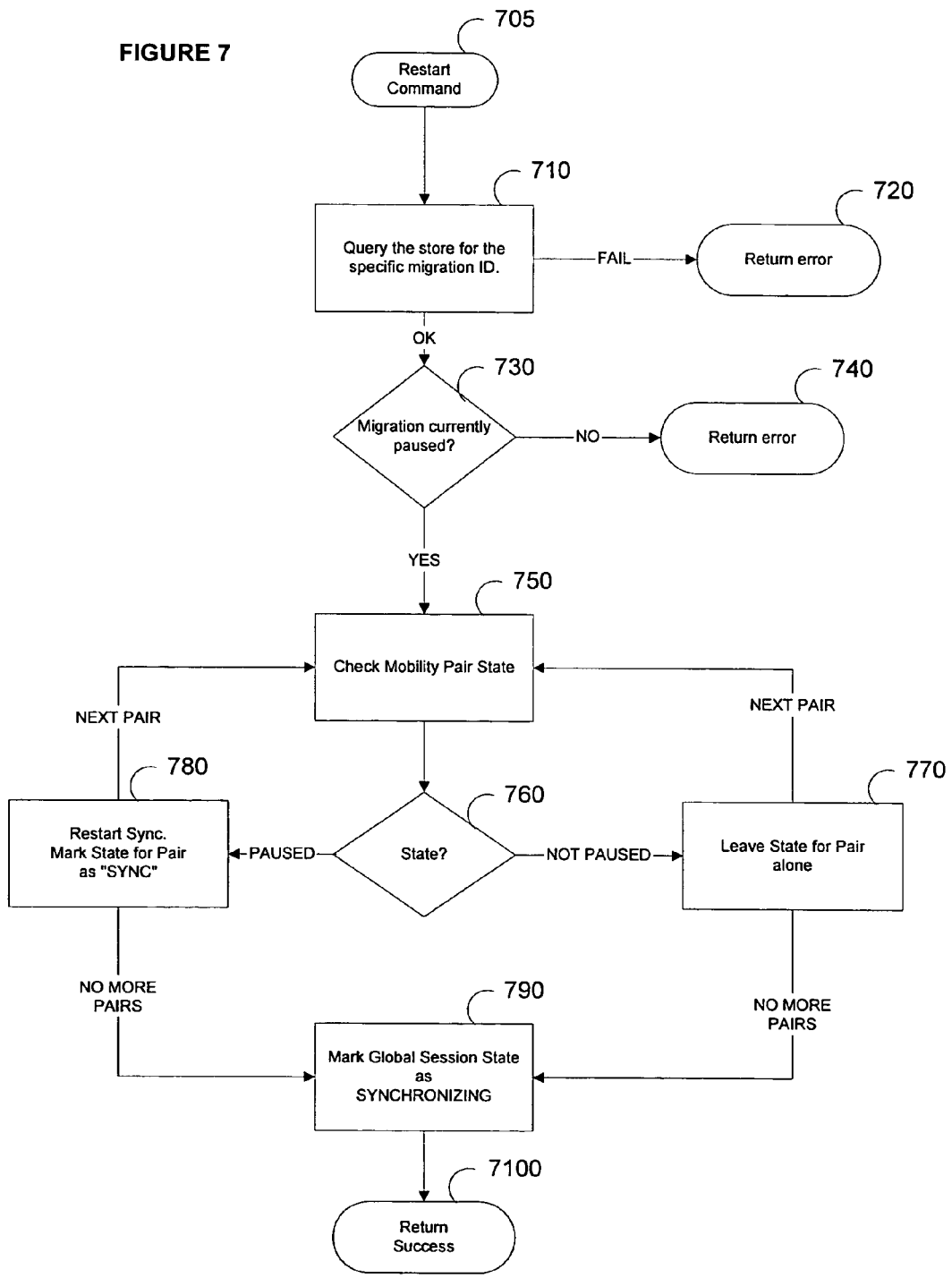
FIG. 7 is a flow diagram depicting a process used to restart a paused migration session in accordance with one embodiment of the invention.

FIG. 7 depicts one embodiment of a process through which an agent that has paused a migration resumes the migration. The depicted embodiment is merely exemplary, as restarting a process can be performed in numerous ways. In act 705, the agent receives a restart command. The restart command may be issued by a user, management tool or other entity.

In response to receipt of the restart command, in act 710 the process retrieves information related to the migration session from its data repository. If that retrieval is unsuccessful, the process proceeds to act 720 wherein it returns an error (e.g., to a user and/or in a system log).

When the retrieval is successful, the process proceeds to act 730, wherein it determines whether the migration session is currently paused. If the session is not paused, the process returns an error to this effect in act 740.

When it is determined in act 730 that the migration session is currently paused, the process proceeds with a series of acts analogous to several described with reference to FIG. 6. In acts 750 and 760, the process checks the state for a first source/target pair in the migration session. As with the process of FIG. 6, the source/target pairs may be processed in any order. When it is determined in act 760 that the considered source/target pair is currently paused, the process proceeds to act 780, wherein it restarts the migration method used for that pair, and updates the data repository to reflect that the pair is actively synchronizing. The process then determines (in act 780) whether more pairs remain to be processed, and if so, goes to the next pair and returns to act 750.

When it is determined in act 760 that the source/target pair is not paused (e.g., if the considered pair is utilizing a migration method which can not be paused), the process proceeds to act 770, wherein the process leaves the state of the pair unchanged, since there is no paused activity to restart. When there are more pairs to examine, the process returns to act 750 to check the next pair's state.

When it is determined in act 770 or 780 that all source/target pairs have been processed, the process proceeds to act 790, wherein the process updates the data repository to reflect the global state of the migration session as actively synchronizing. The process then proceeds to act 7100, wherein it returns a message (e.g., to a user and/or a system log) indicating that the session has been restarted successfully.

As with the process of FIG. 6, in one embodiment of the present invention, when the state of the migration or any pair thereof is modified by the process of FIG. 7, the process communicates this information to one or more other agents in the cluster to facilitate recovery in the event of a failure of the active host as discussed above.

5. Canceling a Migration Session

Figure 8:
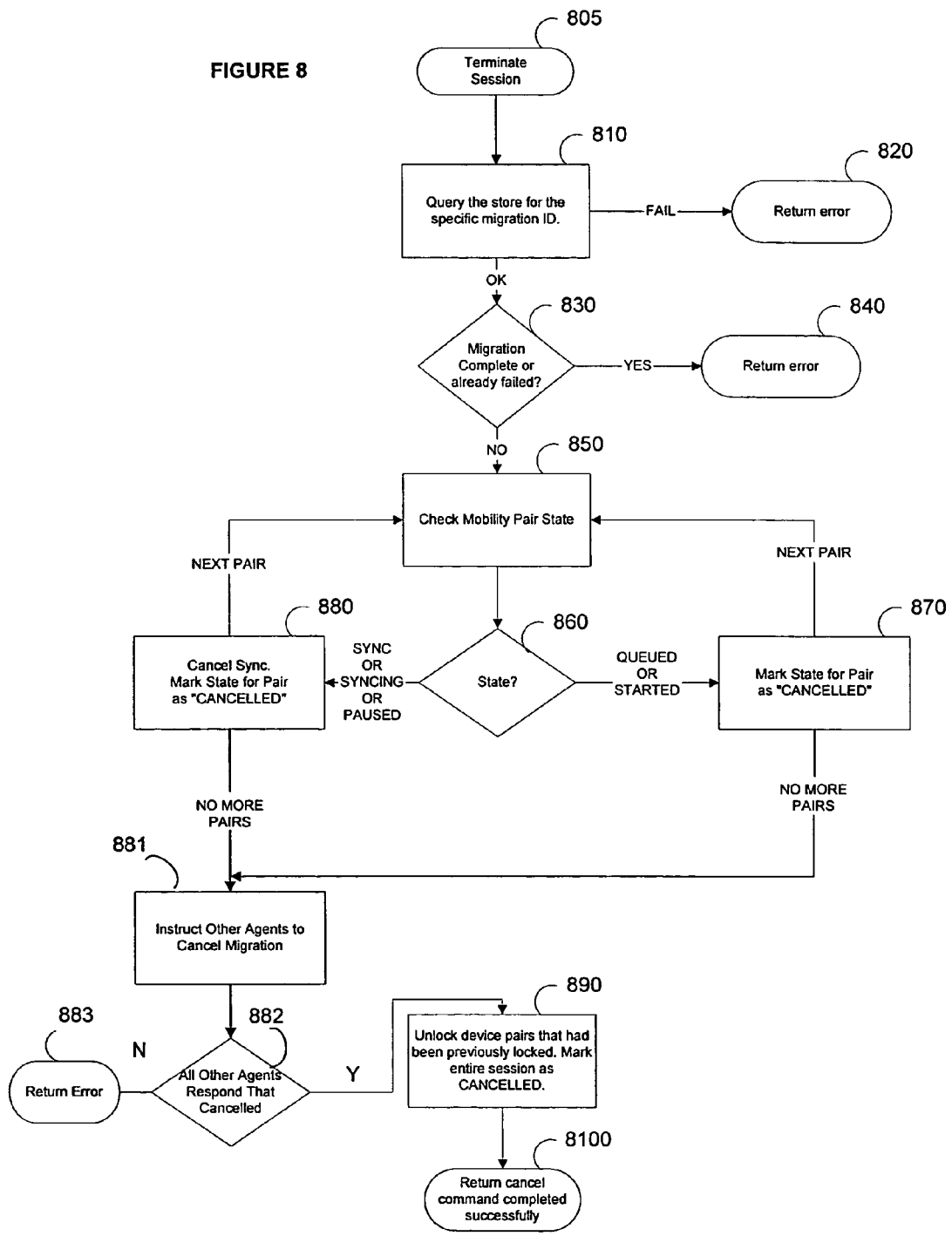
FIG. 8 is a flow diagram depicting a process used to cancel a migration session in accordance with one embodiment of the invention.

In one embodiment, a migration session may be cancelled. The invention is not limited in this regard, as other implementations need not provide this capability. FIG. 8 depicts an illustrative embodiment of a process through which a migration session may be cancelled. The embodiment of FIG. 8 is merely exemplary, as other implementations may be employed to cancel a migration session.

In act 805, the agent that is associated with the host performing the host-based copy receives a command to terminate or cancel the session. The cancel command may be issued by a user, management tool or other entity. In response to the cancel command, in act 810 the process retrieves information related to the migration session from the data repository. When that retrieval is unsuccessful, the process proceeds to act 820, wherein it returns an error.

After successful retrieval, the process proceeds to act 830, wherein it determines whether the migration session in question has already completed or failed, and thus cannot be cancelled. If it has completed or failed, the process proceeds to act 840 to report an error.

When it is determined in act 830 that the migration session has not already completed or failed, the process proceeds to acts 850 and 860, wherein it ascertains the state for a first source/target pair in the migration session. As with the process depicted in FIG. 7, the source/target pairs may be chosen in any order and using any method. When it is determined that the source/target pair is paused, actively synchronizing, or that a request has been received to synchronize but data transfer has not yet begun, the process proceeds to act 880, wherein the agent cancels the migration method for that pair (e.g., by calling the migration method and instructing it to cancel), and updates the data repository to reflect the state for the pair as canceled. The process then (in act 880) determines whether other pairs remain, and if so, goes to the next pair and returns to act 850.

When it is determined in act 860 that the state of the source/target pair is queued or started (i.e., the request to perform the migration between the pair has been received, but the pair is not yet actively synchronizing), the process proceeds to act 870, wherein the process updates the data repository to reflect the state of the pair as canceled. No action is taken in act 870 to cancel any migration process for the pair, because the migration method is not active. After the data repository is updated, the process (in act 870) determines whether there are other pairs to examine, and if so, returns to act 850.

When it is determined at act 870 or 880 that all source/target pairs have been processed, the process proceeds to act 881, wherein the agent instructs all of the other agents (i.e., those associated with hosts, such as the passive hosts, that are not performing the host-based copy) to cancel the migration. Each of the other agents will then unblock I/O access to the source(s) and target(s) for the migration unlock the source(s) and target(s), and can perform clean up operations, such as deleting any temporary data structures provided in the data repository to support the migration. After each of the other agents are instructed to cancel the migration, the process in FIG. 8 proceeds to act 882, wherein a determination is made as to whether all of the other agents have responded that they have successfully taken the appropriate steps to cancel the migration. If any of the other agents does not positively respond, the process proceeds to act 883, wherein an error is returned, and the process is terminated. Conversely, when it is determined at act 882 that all of the other agents have taken the appropriate steps to cancel the migration, the process proceeds to act 890, wherein it unlocks each source/target pair to make them available for another migration. As discussed above, in one embodiment, this can be done by updating the data repository to reflect that each device is no longer locked. Once all devices are unlocked, the process updates the data repository to reflect the global state of migration session as being canceled and proceeds to act 8100, wherein the process reports that cancellation was successful (e.g., by presenting a message to this effect to the user and/or recording a message to this effect in a system log).

6. Auto-Switch and Retire Function

As discussed above, in one embodiment the agent can manage a migration process with an auto-switch and retirement capability, wherein data access attempts are automatically switched to the target location(s), without reconfiguring host computers, at the completion of the migration.

Figure 9:
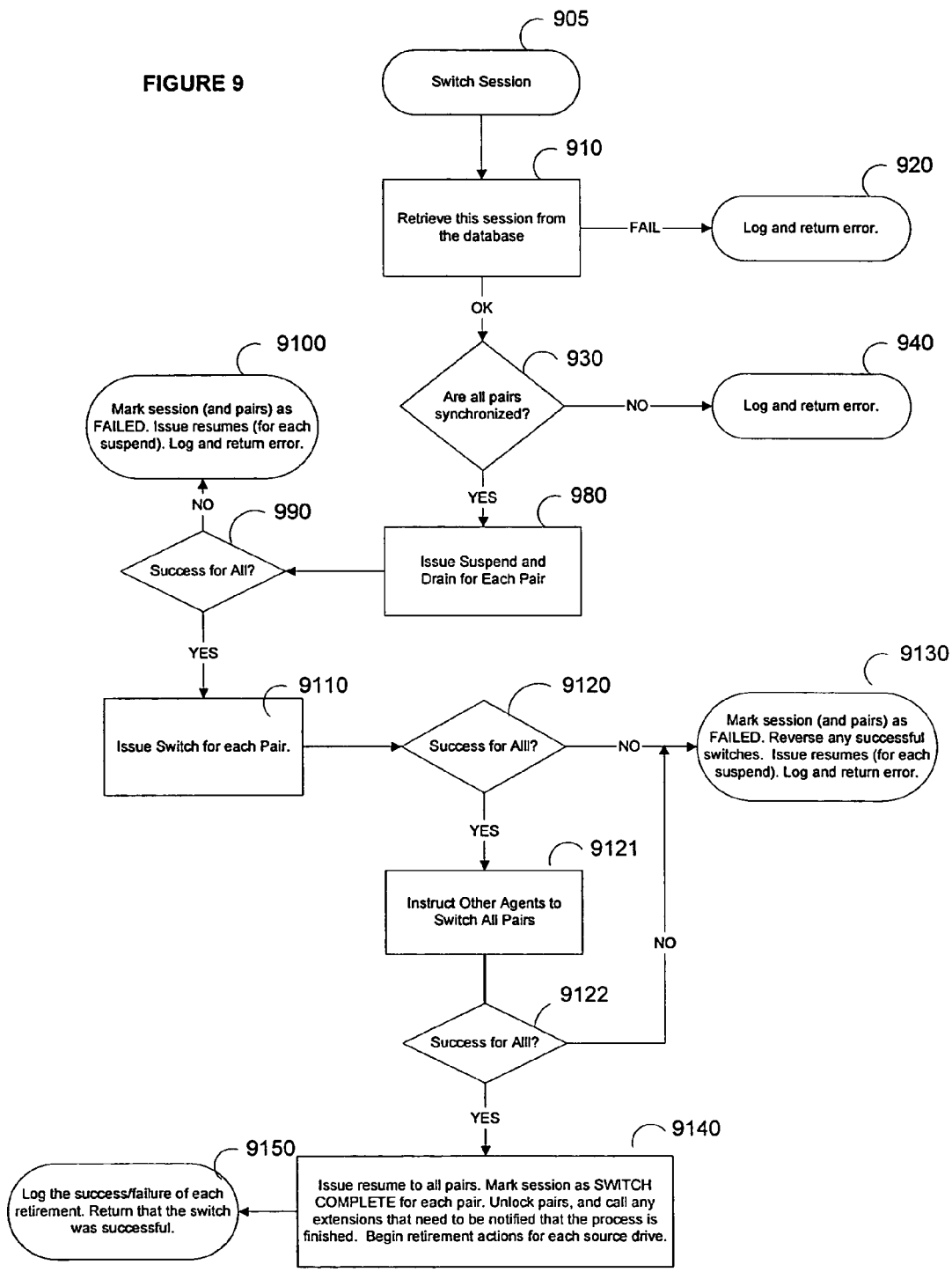
FIG. 9 is a flow diagram of a process used to automatically switch from each source to each target at the completion of a migration session in accordance with one embodiment of the invention.

FIG. 9 depicts an illustrative process executed by the agent associated with the host that performs the host-based copy to manage the auto-switch function and retirement of the source storage resource(s). The depicted embodiment is merely exemplary, as the auto-switch and retirement process may be performed in numerous ways. In the embodiment shown in FIG. 9, the agent performs an auto-switch and retire only when the entire migration session has completed. However, the invention is not limited this respect, as the agent can alternatively perform this process on a subset of the source/target pairs (e.g., one at a time) at the completion of their respective migrations.

The process may be initiated in response to the agent detecting that synchronization for all pairs is completed for a migration session when the data structure specifies that an auto-switch be performed. Alternatively, this process may be initiated in response to an auto-switch command received from a user. Such a command may be submitted when the user sees that all source/target pairs comprising a migration session have been synchronized. Other techniques for initiating an auto-switch process may be used, as the invention is not limited to any particular technique.

When the auto-switch process is initiated, in act 910 the process retrieves information related to the migration session from the data repository. When that retrieval is unsuccessful, the process proceeds to act 920, wherein it returns an error (e.g., by presenting a message to a user and/or recording an error message in a system log).

When the retrieval is successful, the process proceeds to act 930, wherein it determines whether all the source/target pairs comprising the migration session have completed synchronizing, and if not, the process proceeds to act 940 to return an error. As discussed above, in other embodiments the process may execute the auto-switch for a subset of source/target pairs, so acts 930-940 need not be performed for those embodiments.

When it is determined in act 930 that all pairs have been synchronized, the process proceeds to act 980, wherein for each source/target pair for which the auto-switch is to be performed, the process initiates a "suspend and drain" process. Such a process is described in the above-referenced application Ser. No. 10/122,556. In this process, all future input/output requests directed at the source volume(s) are temporarily suspended (in one embodiment, these requests are queued in sequence for subsequent processing against the target volume(s)), and all pending requests are executed (i.e., drained) until no I/O requests remain pending. With some migration methods (e.g., a logical volume manager), a suspend and drain process may not be required, as the migration method itself may provide for temporarily discontinuing I/O requests.

After issuing the suspend and drain, the process proceeds to act 990, wherein it determines whether the suspend and drain process was successful for each source volume. If it was not successful, the process proceeds to act 9100 to take appropriate action. In the embodiment shown, the process updates the data repository to reflect the global state of the migration session as having failed. In an alternative embodiment, the process can update the data repository to reflect that only the source/target pair subset(s) for which the suspend and drain was unsuccessful. In act 9100, the process also takes action to allow access to the source volume(s) to resume, so that the applications are not indefinitely held up by suspended I/O requests, and may inform the other agents in the cluster that the migration has failed so that they can take appropriate action as discussed above (e.g., unblocking I/O operations directed to the source and target pair(s) and unlocking the source and target pair(s)). Finally, the process may return an error (e.g., by presenting a message to the user and/or recording an error message in a system log).

When it is determined at act 990 that the suspend and drain was successful for each source/target pair, the process proceeds to act 9110, wherein it initiates a switch for each source/target pair, so that I/O requests directed at the source volume(s) are redirected to the target volume(s). The switch may be accomplished in any number of ways, as the invention is not limited to any particular technique. In one embodiment for use with the redirection technique described in above-referenced application Ser. No. 10/122,556, the process may accomplish the switch by issuing a command to a base driver on the host computer(s).

The process then proceeds to act 9120 to determine whether the switch was successful for all source/target pairs in question in the agent, and if not, proceeds to act 9130. In act 9130, the agent updates the repository to reflect the global state of the migration process as having failed, and returns an error to that effect. In addition, the process reverses any successful switches, resumes I/O to all of the source volume(s), and may inform the other agents in the cluster to take appropriate action as discussed above.

When it is determined in act 9120 that the switch was performed successfully by the agent associated with the host performing the host-based copy for the source/target pairs in question, the process proceeds to act 9121, wherein the agent instructs the other agents associated with hosts that are not performing the host-based copy to perform a switch for all of the pairs that were migrated. In this respect, after the migration is complete, I/O operations from the passive hosts can be unblocked, such that each is switched so that new I/O operations previously directed to the source(s) will be directed to the target(s). The process then proceeds to act 9122, wherein a determination is made as to whether each of the agents has responded that it successfully performed the switch. If the agents do not respond affirmatively, the process proceeds to act 9130 where, as discussed above, the agent updates the repository to reflect the global state of the migration process as having failed, and returns an error to that effect. In addition, the process reverses any successful switches both in the agent associated with the host-based copy and in each of the other agents, and then resumes I/O to the source volume(s).

When it is determined in act 9122 that all of the agents have successfully performed the switch, the process proceeds to act 9140, wherein it instructs the host computer(s) to resume I/O (which will now be directed at the target volume(s)). The process also updates the status information in the data repository to reflect that the switch is complete for each source/target pair, unlocks the source/target pairs so that other migration sessions may access the devices if desired, and notifies any other processes executing on the computer system (including other agents which will unblock I/O to the source(s) and target(s)) that should be notified that the migration has completed. Examples of the types of processes that may be notified in act 9140 include the migration transfer method, which may then perform clean up operations associated with the migration.

When it has been instructed to do so (either via the data structure or a direct command), in act 9140 the process also initiates source retirement. Source retirement may be performed in any number of ways, as the invention is not limited to any particular technique.

7. Start Up

Figure 10:
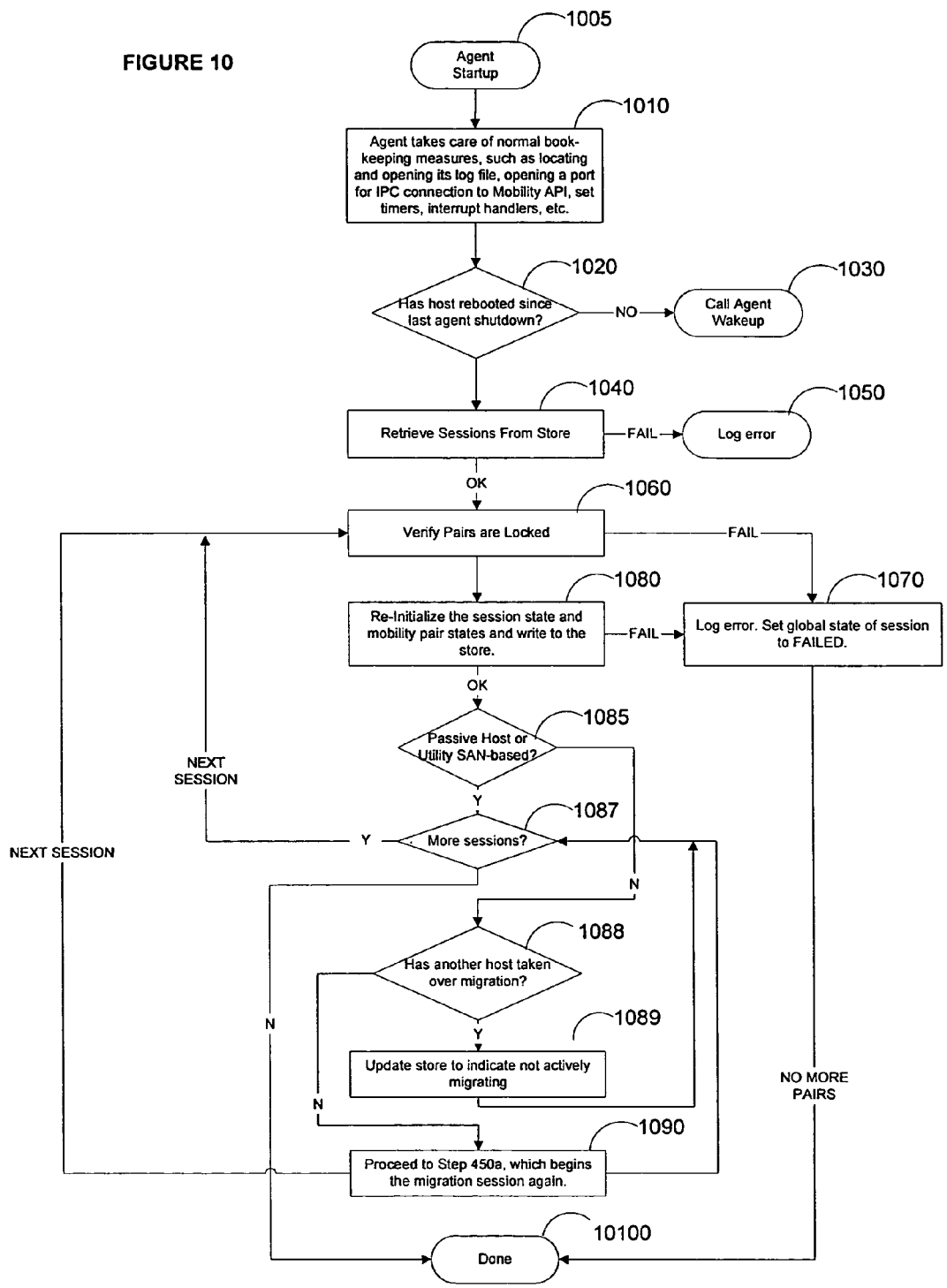
FIG. 10 is a flow diagram depicting a process executed at startup by a migration agent in accordance with one embodiment of the invention.

The startup process is to be distinguished from the wakeup routine described with reference to FIG. 5, and is executed when the agent is started, either initially or following a system failure. FIG. 10 depicts one embodiment of a process performed by the agent associated with the active host upon startup. This process is merely exemplary, as numerous other implementations for a startup process are possible.

In act 1005, the agent receives a command to start up and proceeds to act 1010. In act 1010, the process performs a number of bookkeeping measures. For example, the process may locate and open any log files to be used, open a port for inter-process communication (IPC) with one or more APIs, set timers and interrupt handlers, and perform other similar acts.

The process then proceeds to act 1020, wherein it determines whether the host computer which executes the migration session being managed has re-booted since the last agent shutdown. This determination is made because a reboot of the host may have resulted from a failure of the host during an active migration, so that the process may perform certain acts discussed below in response. The determination of whether the host rebooted since the last agent shutdown is merely one example of a technique for determining a potential host failure during a migration, as other techniques are possible.

When it is determined in act 1020 that the host has not rebooted since the last agent shutdown, the process proceeds to act 1030 wherein it calls the wakeup routine of FIG. 5 to determine the state of migrations currently outstanding, and to determine whether there is action for the agent to take, as discussed above.

When it is determined in act 1020 that the host has rebooted since the last agent shutdown, the process proceeds to act 1040, wherein it attempts to retrieve information on all ongoing migration sessions from the data repository. If the agent is unsuccessful in doing so, the process proceeds to act 1050, wherein it reports an error to that effect (e.g., to the user and/or in a system log).

When the retrieval of information on the session is successful, the process proceeds to act 1060, wherein it determines whether each source/target pair within the migration session is still locked. When the agent determines that any of the source/target pairs are no longer locked, the process proceeds to act 1070, wherein the agent reports an error (e.g., by a message to the user and/or in a system log), updates the data repository to reflect the global state of the migration session as having failed, and concludes the process.

As discussed above, in one embodiment the process is capable of managing each source/target pair migration independently. Thus, in an alternate embodiment, the process may determine that only the pairs which are unlocked have failed, and those which remain locked may be re-initiated.

When it is determined in act 1060 that all source/target pairs remain locked, the process proceeds to act 1080 wherein the process prepares the synchronization to begin anew by updating the data repository to reflect the state of the pairs as synchronizing (i.e., to reflect that a migration session request has been received for the pair, but that data transfer has not yet begun). If the update to the repository fails, the process proceeds to act 1070 to report an error.

When the data repository has been updated, the process proceeds to act 1085, wherein a determination is made as to whether the agent corresponds to a passive host in an active/passive clustered environment or whether the copy utility employed is SAN-based. If either condition is true, the process proceeds to act 1087, wherein a determination is made as to whether any additional migration sessions exist. If so, the process returns to act 1060 to process the next session, and if not, the process terminates.

When it is determined in act 1085 that the agent corresponds to an active host and the copy utility is host-based, the process proceeds to act 1088, wherein a determination is made as to whether another host has taken over the migration as a result of the failure of the host with which the agent executing the process is associated. When it is determined that another host has not taken over the migration, the process proceeds to act 1090, wherein it begins the migration session again by proceeding to act 450*a*, described above with reference to FIG. 4*a*. When it is determined in act 1088 that another host has taken over the migration, the process proceeds to act 1089, wherein the information store is updated to indicate that the agent associated with the process is not actively migrating the data. After the completion of act 1089 or 1090 for the first migration session, in one embodiment the process proceeds to act 1087 wherein a determination is made as to whether any more sessions exist as discussed above. The process then loops through acts 1060, 1080, 1085, 1087, 1088, 1089 and 1090 for each remaining session until it is determined in act 1087 that all sessions have been processed. At this point, the process proceeds to act 10100, wherein the process terminates.

In the embodiments discussed below wherein the migration session is one that is not host-based and saves state during operation, a migration session may be restarted from the point at which it failed. Although advantageous, the present invention is not limited in this respect, as the migration session can, alternatively, be restarted from the beginning.

In the embodiments discussed below wherein the migration method is one that is not host-based and would not have been interrupted by a failure of the host (e.g., a hardware mirroring facility implemented by the storage systems), it may not be necessary to take any action to re-initiate the migration method.

8. Undoing a Migration

One embodiment of the present invention is directed to enabling a migration to be undone after completion, so that the applications that access the data set can revert to accessing the data set from the source storage location(s), as opposed to the target storage location(s). It should be appreciated that this is advantageous in that if problems are detected with the target configuration, the data set need not be taken offline while the problem is corrected. Rather, the applications accessing the data set can be reverted back to the source storage locations. It should be appreciated that the aspect of the present invention relating to the ability to undo a migration is not limited to any particular implementation technique, as any suitable technique can be employed. Thus, the implementations discussed below are provided merely for illustrative purposes, and are not intended to be limiting.

Figure 11:
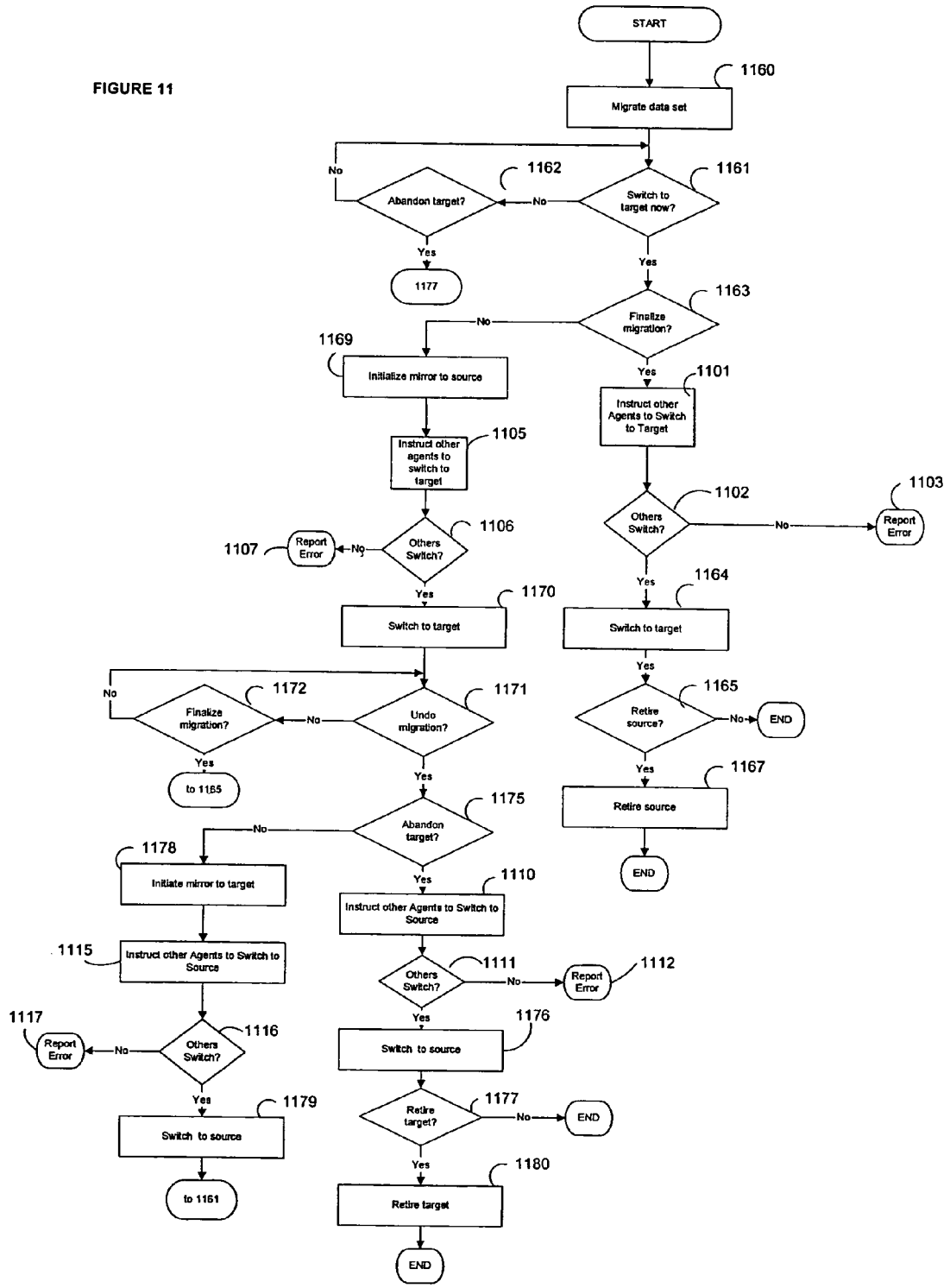
FIG. 11 is a flow diagram of a process that can "undo" a migration of a shared logical object in a clustered computer system environment in accordance with one embodiment of the present invention.

One illustrative embodiment of a process for performing an undo of a data migration in a clustered environment is illustrated in FIG. 11. The process may be executed by one of the agents in the cluster (e.g., the agent associated with the host that performs the host-based copy). In act 1160, the data set is migrated. This migration can be performed in any of numerous ways, including using the migration techniques discussed above, or using any other migration techniques, including manual or conventional techniques. The migration can include a copying of the data set from the source(s) to the target(s). It should be appreciated that the migration of the data set in act 1160 (e.g., the actual copying of the data set) is considered to be accomplished by the process illustrated in FIG. 11, whether that process actually copies the data set itself or calls another process or utility to do so.

In act 1161, the process determines whether to switch the applications that access the data set to access the data set from the target storage locations. This determination can be performed in any of numerous ways. In one example, the determination can be made manually by a system administrator. In another example, the process may automatically determine whether to perform an "auto-switch," as discussed above with reference to FIG. 9.

When it is determined at act 1161 that the applications should not be switched, the process proceeds to act 1162, wherein it determines whether to abandon the target (i.e., abandon the migration). This determination may also be made in any of numerous ways. For example, a system administrator may evaluate whether any potential problems with the migration can be corrected, and if so, may decide to not abandon the migration. When it is determined at act 1162 that the target should not be abandoned, the process returns to act 1161. In this manner, the process loops through acts 1161 and 1162 until it is decided to either switch to (act 1161) or abandon (act 1162) the target.

When it is determined at act 1162 that the target should be abandoned, the process proceeds to act 1177, which is discussed in detail below.

When it is determined at act 1161 that the applications should be switched to the target, the process proceeds to act 1163, wherein it determines whether the migration should be finalized. This determination can be made in any of numerous ways. For example, the determination can be performed manually by a system administrator, who may only finalize the migration after the data set is up and running at the target storage locations in a manner that provides sufficient confidence that the migration has been completed successfully, or the migration may be finalized automatically (e.g., in response to a user preference that was previously established).

When it is determined in act 1163 that the migration should be finalized, the process proceeds to act 1101, wherein it instructs the agents associated with the other hosts in the cluster to switch their applications to the target(s). The act of switching the applications can be performed in any of numerous ways, including using the techniques described above (e.g., the automatic redirection technique discussed above in connection with act 9110 of FIG. 9), or any other suitable technique. In this respect, a technique for switching the applications to access the target(s) can involve the modification of at least one aspect of the computer system so that read requests to the data set are serviced from the target(s) rather than the source(s). The aspect of the computer system modified can include the applications themselves, or can be another aspect of the system so that the switch occurs in a manner that is transparent to the applications.

It should be appreciated that the process in FIG. 11 instructs the other agents in the cluster to switch to the target(s) because once the migration is finalized, all of the hosts in the cluster will access the target(s), such that all should be switched over. After instructing the other agents to switch to the target(s), the process proceeds to act 1102, wherein a determination is made as to whether all of the other agents have responded that the switch has been made successfully. If not, the process proceeds to act 1103 to report an error, as the migration cannot continue unless all of the hosts in the cluster can successfully perform the switch. When it is determined at act 1102 that each of the other agents in the cluster has performed the switch to the target(s), the process proceeds to act 1164, wherein the applications in the host associated with the agent performing the host-based copy are switched to the target(s).

After the switch to the target in act 1164, the process proceeds to act 1165, wherein it determines whether the source storage location(s) should be retired. Again, this determination can be performed in any of numerous ways. For example, a system administrator may make this determination manually, or the source target locations may be retired automatically (e.g., in response to a user preference that was previously established). When it is determined in act 1165 that the source storage locations should be retired, the process proceeds to act 1167, wherein the process performs the retirement, and then terminates. When it is determined in act 1165 that the source locations should not be retired, the process terminates.

It should be appreciated that once the migration is finalized in act 1163, the migration is over, such that all of the agents can unlock the source and target pair(s), the agents associated with the passive agents can unblock I/O operations directed to the source and target pair(s), and the agents can perform clean up operations as discussed above.

As discussed above, there are numerous techniques for retiring a volume. Some of these techniques are implemented at the storage system itself (e.g., making a volume "not ready" so that it will be inaccessible to any host), while others are implemented in the host itself. When the retirement technique employed in act 1167 is not host-dependent, the volume can be retired by the agent executing the process of FIG. 11 without communicating with the other agents in the cluster. Alternatively, when the retirement technique employed is one that is host-based, the agent implementing the process of FIG. 11 can communicate with the other agents in the cluster to instruct them to take steps necessary to retire the source, and can await confirmation from each of the agents that they have completed this act successfully before completing the act 1167.

When it is determined at act 1163 that the data migration should not be finalized, the process proceeds to act 1169, wherein a mirroring relationship is initialized so that all writes to the data set are mirrored to the source storage locations. This facilitates the possible undoing of the migration as discussed below, by ensuring that the source volume(s) are accurate mirrors of the target volume(s). In the embodiment shown in FIG. 11, the process for performing an undo of the data migration initiates a mirroring relationship in act 1169, but does not perform the actual mirroring of the data itself, as this can be implemented by another process or utility. It should be appreciated that the present invention is not limited in this respect, and that the reference to the undo process mirroring data can refer to either the establishing of a mirroring relationship to be performed by another process, or the undo process can perform the mirroring of the data itself.

It should be appreciated that when the mirroring is performed by the storage system itself or a component of the storage area network, rather than by the host, the process illustrated in FIG. 11 can initiate the mirroring relationship in act 1169 without coordinating with the other agents in the cluster. Alternatively, in accordance with one embodiment of the present invention, when the mirroring technique is host-based, the process illustrated in FIG. 11 can, during act 1169, communicate with each of the other agents to ensure that each has initiated a mirroring of the source(s) to the target(s), so that in the event that any of those other hosts performs a write to the target(s) after the switch, the data will be mirrored to the source(s) to leave open the possibility of undoing the migration as discussed below. This communication is desirable in an active/active configuration, because all of the active hosts may be writing to the source(s), such that those writes should be mirrored to the target(s).

In one embodiment of the present invention, the above-discussed coordination with the other agents when initializing the mirroring in act 1169 can also be performed in an active/passive configuration for either of two reasons. First, although passive hosts should not be writing to the source volume(s), initiating a mirroring relationship in act 1169 for the passive hosts provides an additional level of security to ensure consistency between the source and target volume(s) in the event that such a write occurs. Furthermore, as discussed in more detail below, in accordance with one embodiment of the present invention, when an active host performing a host-based migration fails, the migration is not aborted, but can be taken over by one of the passive hosts without starting over. In accordance with that embodiment of the present invention, it is desirable to initiate the mirroring relationship in act 1169 in the passive hosts, so that when a passive host seeks to take over the role of a failed active host, the new active host will have established the mirroring relationship between the source and target volume(s) to ensure consistency between those volume(s). It should be appreciated that in accordance with the embodiment of the present invention wherein in response to a failure of the active host performing a host-based copy the migration is either aborted or started over again from the beginning, the mirroring relationship need not be coordinated with each of the passive hosts in act 1169.

After the mirroring relationship is initialized, the process proceeds to act 1105, wherein it instructs the other agents in the cluster to switch to the target in a manner analogous to act 1101 discussed above. Thereafter, the process proceeds to act 1106, wherein a determination is made as to whether each of the other agents has performed the switch successfully. If not, the process proceeds to act 1107 to report an error. Alternatively, when it is determined that each of the other agents in the cluster has successfully initiated the switch to the target, the process proceeds to act 1170, wherein the applications on the host associated with the agent executing the process of FIG. 11 are switched to the target(s). As discussed above with reference to act 1164, the act of switching the applications can be performed in any of numerous ways.

Next, the process proceeds to act 1171, wherein a determination is made as to whether to undo the migration. Again, this act can be performed in any of numerous ways, as the present invention is not limited to any particular implementation technique. In accordance with one embodiment of the present invention, this determination is made manually by a system administrator when it is determined that errors exist in the target configuration for the data set that has been migrated.

When it is determined at act 1171 that the migration is not to be undone at a particular point in time, the process proceeds to act 1172 to again determine whether the migration should be finalized. As with the determination at act 1163, this determination may be performed in any of numerous ways. When it is determined at act 1172 that the migration should be finalized, the process proceeds to above-discussed act 1165, wherein the process determines whether the source storage locations should be retired (as discussed above), optionally retires the source (1167), and then terminates.

When the process determines at act 1172 that the migration should not be finalized, the process returns to act 1171. In this manner, the process loops through acts 1171 and 1172 until a determination is made either at act 1171 to undo the migration, or at act 1172 to finalize the migration.

When it is determined at act 1171 that the migration is to be undone, the process proceeds to act 1175, wherein the process determines whether to abandon the migration. In this respect, it should be appreciated that when errors are identified in a target configuration, a system administrator might simply seek to correct certain errors rather than abandoning the entire migration. This is facilitated in the embodiment of the invention shown in FIG. 11.

When it is determined at act 1175 that the target configuration for the data set is to be abandoned, the process proceeds to act 1110, wherein it instructs the other agents in the cluster to switch to the source in a manner analogous to that discussed above in connection with act 1101. Thereafter, the process proceeds to act 1111 wherein a determination is made as to whether the other agents in the cluster have successfully switched to the source, and when they have not, the process proceeds to act 1112 to report an error. When it is determined at 1111 that the other agents have completed the switch to the source successfully, the process proceeds to act 1176, wherein the applications that access the data set are switched back to the source storage locations in the host associated with the agent executing the process of FIG. 11. This can be performed in any of numerous ways, as this aspect of the present invention is not limited to any particular implementation technique. For example, when the migration is performed using the automatic redirection techniques discussed above, the act 1176 can be performed in an analogous manner, but wherein the steps performed to initiate the redirection are essentially undone, so that the access requests pass to the source storage locations. Of course, numerous other techniques can also be employed, including manual reconfiguration techniques.

After the switch to the source is complete, the process proceeds to act 1177, wherein it determines whether the target storage locations should be retired. If so, the process proceeds to act 1180, wherein the target locations are retired, and then terminates. The act of retiring the target storage locations is analogous to retiring the source storage locations, and can be performed in any of numerous ways, as discussed above. As with the retirement of the source, when the retirement technique is independent of the host devices, the process can simply retire the target(s) itself without coordinating with the other agents in the cluster, while when the retirement technique is host-based, the process illustrated in FIG. 11 can communicate with the other agents to coordinate retirement of the target(s).

When the process determines in act 1177 that the target storage locations should not be retired, the process simply terminates. The process may determine that the target storage locations should not be retired for any of numerous reasons. For example, a system administrator may wish to examine the data at the target storage locations to diagnose errors with the migration, so that it can be attempted again at a later time.

When it is determined at act 1175 that the target configuration of the data set is not to be abandoned, the process proceeds to act 1178, wherein a mirroring relationship is initiated so that all writes to the data set that are directed to the source storage locations are mirrored to the target locations. In this manner, the target is maintained as an accurate minor of the source, thereby keeping available the option to reinstate the migration by switching to the target in the future without re-migrating the data set. The process then, in one embodiment, takes action to coordinate with the other agents in the cluster. It should be appreciated that the present invention is not limited in this respect, and that numerous implementations are possible. For example, as discussed above, when the migration is initiated, I/O operations from the passive hosts are blocked (act 446 in FIG. 4*b*). In one embodiment of the present invention, each the time agent associated with the host performing the host-based copy performs a switch between the source(s) and target(s), it coordinates with the other agents in the cluster to similarly perform a switch, so that when the I/O operations are unblocked in the other agents, they are at that point directed to the appropriate volume(s). It should be appreciated that the present invention is not limited in this respect, and that the actual switching in the other agents to a different volume can alternatively be performed only if and when the I/O operations directed to the source(s) and target(s) are unblocked.

As mentioned above, in the embodiment of the present invention illustrated in FIG. 11, steps are taken to coordinate with the other agents in the cluster to perform a switch between the source(s) and target(s) each time such a switch is made in the agent associated with the host performing the host-based copy. Thus, after the mirror is initiated to the target in act 1178, the process proceeds to act 1115, wherein it instructs the other agents to perform a switch to the source(s), and then proceeds to act 1116 to determine whether all of the other agents have completed the switch successfully. When it is determined that all of the other agents have not successfully completed the switch, the process proceeds to act 1117, to report an error and terminate. Conversely, when it is determined at act 1116 that the other agents have successfully performed the switch, the process proceeds to act 1179, wherein the applications that access the data set are switched back to the source storage locations on the host associated with the agent performing the process of FIG. 11. As discussed in connection with act 1176, this can be performed in any of numerous ways.

The process then returns to act 1161, wherein the process will take no further action until it determines (in act 1161) to switch the applications to the target storage locations, or determines (in act 662) to abandon the target, as discussed above. In this manner, the target data set will be maintained as an up-to-date copy of the source data set. Thereafter, a decision can be made by the system administrator to either attempt to switch over to the target storage locations again, in a manner similar to that discussed above, or to simply abandon the target storage locations so that the mirroring to the target storage locations can cease, and the target storage locations can optionally be retired.

It should be appreciated that FIG. 11 depicts merely one illustrative embodiment of a process to undo a migration, and that other embodiments may include acts different from those described, acts which are performed in a different order, and/or acts which are performed in parallel.

9. Rebooting of the Host Computers after the Switch to the Target(S)

As mentioned above, the present invention is not limited to any particular technique for switching applications to access the target(s) rather than the source(s). However, in accordance with one embodiment of the present invention, such switching is performed by redirecting I/O operations directed to the source(s) to the target(s) as discussed above. In a clustered environment, the information identifying this redirection can be stored in each of the hosts so that each host can redirect its I/Os. In accordance with one embodiment of the present invention, this information is stored in a persistent storage location, such that if one or more of the host computers is rebooted, the host computer can continue to implement the redirection to ensure that the appropriate volume(s) is accessed.

In an alternate embodiment of the present invention, a technique is employed so that after a migration is finalized and the host computer is rebooted, the switch to the target(s) can be maintained in a different manner, rather than using the redirection techniques discussed above. In this respect, in co-pending application entitled) "Method and Apparatus for Undoing a Data Migration in a Computer System", Ser. No. 10/421,252, filed on even date herewith, which is incorporated herein by reference, a policy-based open technique is employed wherein an open directed to one volume can be responded to by opening a different volume. In accordance with one embodiment of the present invention, after a migration has been finalized and the switch is made to the target(s), if one of the host computers in the cluster is subsequently rebooted, then when the applications on the rebooted host that access the migrated data set again seek to open the appropriate source volume(s), a policy-based open technique can be employed to respond to the request to open the source volume(s) by returning the identifier(s) for the target volume(s), so that the target volume(s) is directly opened. Thus, all future I/O requests will be directed to the target(s) and need not be redirected in the manner discussed above. In accordance with this embodiment of the present invention, rather than a host storing information that identifies redirection for I/O requests, a host can store information that shows a mapping for responding to an open request to the source(s) by opening the target(s).

10. Responding to Failure of the Host Performing a Host-Based Migration

In an active/passive clustered environment, when the active host fails, the clustering software will automatically take action to bring the applications up on one of the previously-passive hosts, so that there will be a switch to a new active host. The present invention provides a number of options for dealing with such a failure while a migration of a shared data set is in progress.

In accordance with one embodiment of the present invention, the migration can simply be aborted. In accordance with this embodiment of the present invention, the agent associated with the new active host can take steps to unblock I/O access to the source(s) and target(s) locally, and can also instruct each of the other agents in the clustered environment to do the same. The agents can then also perform clean up operations to remove any data structures that were created to support the migration.

In an alternate embodiment of the present invention, the agent associated with the new active host can simply restart the migration from the beginning. In this respect, other agents in the clustered environment need not be updated at all, as they should already be in a state wherein I/O operations are blocked to the source(s) and target(s). Thus, the agent associated with the new active host can simply perform the functions discussed above to restart the migration, and may be able to avoid some of the above-discussed coordination with the other agents, as they are already in a state to allow the migration to proceed.

Finally, in an alternate embodiment of the invention (of course, all of these embodiments can be supported in a single implementation with the user being provided with an option as to which to select), the agent associated with the new active host seeks to complete the migration without restarting from the beginning. In accordance with this embodiment of the invention, techniques can be employed to track portions of the data set for which the migration has been completed. While the present invention is not limited to any particular tracking techniques, two examples of such tracking techniques are disclosed in co-pending application Ser. Nos. 10/281,524, filed Oct. 28, 2002, entitled "Method and Apparatus for Monitoring the Storage of Data in A Computer System", and 10/211,469, filed Aug. 2, 2002, entitled "Method and Apparatus for Migrating Data", each of which is incorporated herein by reference.

In accordance with one embodiment of the present invention, the state information about the progress of the migration can be stored on the storage system itself, so that following the failure of the host performing the migration, the new active host can access this state information directly from the storage system and can use the state information to continue the migration without restarting the entire migration. Alternatively, in another embodiment of the present invention wherein the state information is stored on the host computer itself, when the host performing the migration writes the state information locally, it can broadcast that state information to all of the passive hosts, such that each passive host will have access to the state information in the event that the active host fails, and can complete the migration without beginning over from the beginning.

C. Summary of Active/Passive Host-Based Migration

It should be appreciated that the numerous capabilities discussed above relating to a migration (e.g., pausing, canceling, queuing pairs, automatically switching, undoing, etc.) are provided merely for illustrative purposes, as the present invention is not limited to use with migration techniques that include these features. Rather, aspects of the present invention relate to performing a migration in a clustered environment, and are not limited to providing those capabilities. For example, an aspect of the present invention relates to performing an on-line migration in a clustered environment so that the migrated data set remains available during the migration and after. Another aspect of the present invention relates to coordinating a migration among multiple host computers (and/or their associated agents) in a clustered environment. The illustrative embodiments described above merely provide examples of the types of coordinating communications that can be performed and the functionality that can be achieved as a result, as numerous other examples are possible. Finally, as discussed in more detail below, one embodiment of the present invention relates to the ability to withstand the failure of a host computer during a migration in a clustered environment without having to abort or redo the migration.

As should be appreciated from the foregoing, independent of the various utilities and capabilities discussed above (e.g., pausing, undoing, etc.), the considerations raised by the performance of a migration in an active/passive clustered environment using a host-based copy technique can be summarized as follows:

A. A request provided to initiate a migration (e.g., the StartSession request provided by a management entity) can identify all of the hosts in the cluster that will be impacted by the migration, and define the transfer method as a host-based copy. The request can be sent to all of the agents in the cluster, or can be sent to a single agent that can distribute the information to its peers.

B. Each agent can perform a verification process as described above, to ensure visibility to the source(s) and target(s), to verify that each volume is not locked or in use by another, to verify retirement options, etc.

C. After all agents agree that the operation is legal, each prepares for the ensuing operation by recording information relating to the operation in its respective data store, and locking the source(s) and target(s) to identify the volumes as part of an ongoing migration. In addition, the agents associated with the passive hosts block I/O to the source(s) and target(s) during the migration.

D. The active agent does not begin the actual copy operation until all of the agents have performed the above functions.

E. Any operations (e.g., including optional operations such as switching between the volumes, canceling a migration, undoing a migration, committing or finalizing a migration, retiring a volume) that impact multiple hosts may involve coordination among all of the agents in a cluster.

F. If the active host fails during the migration, the other agents in the cluster may take actions to recover from the failure, either by aborting the migration, restarting it from scratch, or completing the migration without starting over.

IV. Active/Passive Clustered Environment with a SAN-Based Copy Utility

A migration in an active/passive clustered environment performed using a SAN-based migration method is similar in many respects to the above-described migration in an active/passive clustered environment using a host-based migration method except, of course, in the nature of the migration method. Thus, in accordance with various embodiments of the present invention, the numerous capabilities and functionalities discussed above in connection with performing a migration in an active/passive clustered environment using a host-based copy utility can similarly be employed in an active/passive clustered environment using a SAN-based migration method (e.g., pausing a migration, undoing a migration, etc.). Of course, the aspect of the present invention related to performing a migration in an active/passive clustered environment using a SAN-based migration method is not limited to providing any of these capabilities.

In accordance with various embodiments of the present invention, techniques quite similar to those discussed above in connection with an active/passive clustered environment using a host-based migration method can similarly be employed using a SAN-based migration method. There are only a few areas wherein the migration techniques differ when employing a SAN-based migration method, and those differences will be highlighted below.

One technique for performing a migration using a SAN-based copy routine in an active/passive cluster will now be described. Initially, referring to the illustrative computer system configuration of FIG. 2, when a SAN-based migration method is employed, the network 209 or the storage systems 207, 221 will be provided with a utility to enable copying data from the source volume 205 to the target volume 223 without passing through the hosts 201, 203. An example of such a utility is the above-discussed SYMMETRIX remote data facility (SRDF) available from EMC Corporation, which involves a direct link (not shown) between the storage systems 207, 221. However, it should be appreciated that the SAN-based migration method is not limited to the use of SRDF, as numerous other transfer utilities can be employed.

Referring to consideration A in the summary of the host-based migration method, similar acts can be performed using a SAN-based migration method, with the only difference being that the request to initiate the migration will identify the transfer method as a SAN-based copy, rather than host-based.

Considerations B and C are the same, such that each of the agents can go through a verification process and prepare for the migration in a coordinated fashion, so that the migration is not initiated unless and until all of the agents are able and ready to begin the migration.

Referring to consideration D, the technique for implementing a SAN-based migration is similar, in that the migration is initiated only after all of the agents are prepared, but the method of initiating the migration differs. In this respect, rather than the host beginning to perform the migration by executing reads from the source volume(s) and writes to the target volume(s) one of the agents (e.g., the one associated with the active host) can initiate the migration simply by issuing a command to the utility in the SAN that will perform the migration. For example, when employing SRDF as the transfer utility, the agent can issue an "establish" command via an application programming interface (API) to instruct the storage systems to establish a mirror between the source and volume(s).

With respect to consideration E, the same coordination between multiple agents can take place when switching between two volumes, canceling a migration, undoing a migration, committing to finalization of a migration, retiring a volume when retirement techniques are employed that are not executed by the storage systems themselves, etc. Depending upon the nature of the SAN-based copy utility employed, switching between the source and target volume(s) may involve some additional acts. For example, when employing a remote data facility such as SRDF, the target volume(s) typically is write protected when it is established as a mirror for the source volume(s). Thus, a switch from the source to the target volume(s) and the initialization of a mirror from the target to the source volume(s) may involve disabling direct access to the source volume(s), enabling access to the target volume(s) and the establishment of a reverse mirror. These acts can be implemented by the storage systems themselves and in accordance with one embodiment of the present invention, one of the agents (e.g., the one associated with the active host) transmits the appropriate commands to the storage systems to implement the switch.

Finally, the considerations F discussed above in connection with failure of the active host during a migration are not a concern when employing a SAN-based migration method, as the failure of the host does not impact the migration, which can continue because it employs a migration technique that is not dependent upon the host. Thus, the integrity of the migration operation is not impacted by the failure of the active host, such that normal recovery techniques performed by the clustering software are sufficient to address the failure.

V. Active/Active Clustered Environment and Host-Based Copy Utility

As discussed above, in an active/active clustered environment, two or more servers running clustering software have the ability to issue I/O requests to the same volume(s) in one or more storage systems. For example, referring to the illustrative configuration in FIG. 2, rather than being passive, the host 203 may be active, and along with host 201, may have the ability to issue I/O requests to the source volume 205.

Like in the active/passive configuration of FIG. 2, in an active/active configuration, clustering software 211 on the host systems communicate (as illustrated at 213) to achieve the clustered environment. The nature of the communication in an active/active configuration is more robust than in the active/passive configuration discussed above. For example, although multiple hosts in an active/active configuration have the ability to simultaneously access one or more storage volumes, the clustering software performs communication to ensure that no two hosts are writing to the same blocks within a particular volume to avoid contention. One way in which clustering software products achieve this avoidance of contention is by performing range locking, wherein before a host can write to particular blocks within a volume, the host must lock those blocks to prevent access by other hosts in the clustered environment. Only when the blocks are locked can the host write to those blocks. In view of the fact that all clustering software provides some capability similar to the above-discussed range locking to prevent contentions, the aspects of the present invention discussed below relating to an active/active clustered environment assume that the clustering software provides some such functionality.

The migration using a host-based copy in an active/active clustered environment is similar in many respects to the above-described migration using a host-based copy in an active/passive clustered environment, and the various features and functionalities discussed above (e.g., pausing a migration, undoing a migration, etc.) can be performed in an active/active clustered environment in accordance with various embodiments of the present invention. Thus, much of the explanation provided above in connection with the active/passive clustered environment is applicable to an active/active environment as well, and only the areas of difference will be highlighted below.

In connection with consideration A, a migration in an active/active configuration can be begun in the same way as discussed above in the active/passive environment, with a difference being that the request identifies the environment as being an active/active environment, rather than an active/passive environment. The considerations B and C are similar in many respects, as each of the agents can go through a verification process and prepare for the migration before it is begun in much the same manner as discussed above. There is one difference in the actions the agents may take to prepare for the beginning of the migration. In the discussion of the active/passive configuration, one of the actions that was taken was to block I/O operations from the passive hosts to the source and target volume(s). In the active/active configuration, I/O operations are not blocked to the source, because all of the active servers have the ability to access the source. Blocking access to the source is not needed in the active/active environment, as the clustering software will, as discussed above, have a range locking capability that prevents contentions.

However, in the active/active configuration, during the set up prior to the initiation of the copy routine, I/O operations directed to the target volume are blocked to the target from anything other than the host-based copy utility that performs the migration. Thus, no other applications can access the target. It should be appreciated that other applications should not seek to write to the target, but that blocking I/O operations to the target provides an additional level of security in this regard. It should be further appreciated that in some embodiments of the present invention discussed above that employ migration techniques wherein at least some writes to the source volume(s) during the migration are also written (or mirrored) to the target volume(s), such writes can be made to the target volume(s) despite the blocking of I/O operations discussed above. For example, in connection with the embodiments of the present invention that save state of the migration during the migration process (e.g., using a checkpoint or otherwise), writes to the source volume(s) that occur to areas that have already been copied to the target volume(s) (e.g., writes before the checkpoint) may be mirrored to the target volume(s). Alternatively, for embodiments that do not maintain state, every write to the source volume(s) during the migration may be mirrored to the target volume(s). Thus, the reference to blocking I/O operations to the target volume(s) is not intended to exclude such mirroring writes. In accordance with one embodiment of the present invention wherein the mirroring writes are performed at a lower level in the I/O stack than the application layer (e.g., in drivers in the I/O stack as discussed in the above-referenced related application Ser. No. 10/122,556 that is incorporated herein by reference), the writes from the application layer are blocked to the target volume(s), but writes from lower levels in the I/O stack are not. Of course, it should be appreciated that the present invention is not limited to this or any particular implementation technique.

In connection with the consideration D relating to the initiation of the migration operation itself, this can be performed in any of numerous way in an active/active configuration, as the present invention is not limited to any particular implementation technique. In this respect, one of the active servers (referred to herein as a master) can be identified to perform the migration operation by performing reads from the source(s) and writes to the target(s). Alternatively, the performance of the migration can be split among two or more active hosts with the hosts either alternating in time to reduce the load on any particular host, or with the hosts splitting ranges of blocks or volumes to be copied among them to balance the load.

In accordance with one embodiment of the present invention, an additional layer of communication is provided between the active servers during the migration to identify the source blocks currently being copied by the copy utility at any particular time. This can be employed like the range locking discussed above to prevent any other hosts from writing to the area being copied and thereby prevent inconsistencies. This communication can be performed in any of numerous ways as the present invention is not limited to any particular implementation technique. In this respect, the agents can develop their own proprietary communication scheme, as the agents have the ability to communicate as shown, for example, at 219 in FIG. 2. Alternatively, some clustering software packages may provide hooks or interfaces that can enable other utilities (e.g., such as the mobility agents) to use the clustering software communication scheme to achieve communication between the hosts. Thus, regardless of the particular communication technique employed, when a range of blocks is currently being migrated, techniques similar to the range locking discussed above can be employed to prevent access to those blocks by the active servers. This, along with the functionality inherent in the clustering software to prevent conflicts from two servers actively writing any particular area, prevents inconsistencies.

With respect to consideration E, the same coordination between multiple agents can take place when switching between two volume(s), canceling a migration, undoing a migration, committing to finalization of a migration, retiring a volume when retirement techniques are employed but are not executed by the storage systems themselves, etc.

Finally, in connection with consideration F relating to the failure of a host performing the host-based copy operation, the other hosts in the clustered environment will have sufficient information to complete the migration without having to restart from the beginning, although the present invention is not limited in this respect, as embodiments thereof certainly encompass a host-based migration in an active/active environment wherein the migration is restarted from the beginning in the event of a host failure. As discussed above, in the active/active clustered environment, messaging is performed by the clustering software to lock any blocks before they are written, so that if a host fails while attempting to write to certain blocks, the clustering software enables the other hosts in the clustered environment to know which blocks were being written and to thereby recover and take over for the failed host. Similarly, in one embodiment discussed above, the host-based copy routine ensures that the blocks being copied at any given time during the migration are locked, such that this information is provided to the other hosts in the cluster as well. Thus, so long as the other agents in the cluster have an appreciation of the state of the migration (e.g., from the checkpoint or other migration state information discussed above or by examining the range locking information transmitted by the active host writing to the target), another host in the cluster can take over the migration.

In connection with the discussion above relating to the active/passive clustered environment using a host-based copy, a new host that took over the migration performed an act of unblocking I/O operations to the source(s), but such an operation is unnecessary in the active/active environment, wherein any new active host is not blocked from accessing the source(s).

VI. Active/Active and SAN-Based Copy Utility

The performance of a migration in an active/active clustered environment using a SAN-based copy routine is similar in many respects to the techniques discussed above.

With respect to consideration A, the migration can be initialized in a manner similar to that discussed above, but with the initial request indicating an active/active clustered environment and a SAN-based copy utility. Considerations B and C are similar, with the agents in the cluster verifying the ability to perform the migration as requested, and preparing to begin the migration before initiating the actual copy routine. During initialization, I/O operations from the other hosts are not blocked to the source because of the active/active configuration as discussed above, but they are blocked to the target.

With respect to the actual initiation of the copying in consideration D, as with the SAN-based copy in the active/passive configuration, the copy process may be initiated by a command (e.g., the establish command when using SRDF as discussed above) to initiate the transfer of information. During the process of performing the copy operation, some SAN-based copy utilities (e.g., SRDF) will automatically address any potential inconsistency issues that arise from blocks in the source volume being written while they are being copied to the target. Thus, when such a utility is employed, there is no need to perform the range locking techniques discussed above for the blocks being actually copied.

In connection with consideration E, similar to the configurations discussed above, coordination may take place between the agents when performing various actions such as switching between source(s) and target(s), canceling a migration, undoing a migration, finalizing a migration, retiring a volume using a technique that is host-dependent, etc.

Finally, in connection with the failure of one of the hosts, recovery issues specific to the migration process need not be addressed because as discussed above in connection with the active/passive configuration that employs a SAN-based copy utility, the copy utility is independent of any host and will continue to operate, such that there will be no issues concerning the integrity of the copy operation or the completing of the copy.

VII. Agent and Data Repository Configuration

In one embodiment, the operation of a group of agents is coordinated by a central management facility, such as the above-described ECC management tool. However, the invention is not limited in this regard; among the possible operable agent configurations are those where the operations of one or more agents are coordinated by a single "master" agent. Alternatively, multiple agents may operate in parallel, function so that a management tool coordinates the operations of only a subset of all agents deployed, and other configurations.

In one embodiment, the agent operates in response to instructions provided by a user (which may be an administrator, although the invention is not limited in this respect). The user may provide these instructions via a graphical user interface (GUI) (e.g., provided by a management tool), which may allow the user to specify parameters for each source/target pair and/or the migration session overall. However, the invention is not limited in this respect, as other input facilities (such as a command line interface, or other suitably designed input facility) may be employed.

The above-described embodiments of the present invention can be implemented in any of numerous ways. For example, the above-discussed functionality can be implemented using hardware, software or a combination thereof. When implemented in software, the software code can be executed on any suitable processor or collection of processors, whether provided in a single computer or distributed among multiple computers. In this respect, it should be appreciated that the above-discussed functions of the agent can be distributed among multiple processes and/or systems. It should further be appreciated that any component or collection of components that perform the functions described herein can be generically considered as one or more controllers that control the above-discussed functions. The one or more controllers can be implemented in numerous ways, such as with dedicated hardware, or by employing one or more processors that are programmed using microcode or software to perform the functions recited above. Where a controller stores or provides data for system operation, such data may be stored in a central repository, in a plurality of repositories, or a combination thereof.

It should be appreciated that one implementation of the embodiments of the present invention comprises at least one computer-readable medium (e.g., a computer memory, a floppy disk, a compact disk, a tape, etc.) encoded with a computer program (i.e., a plurality of instructions), which, when executed on a processor, performs the above-discussed functions of the embodiments of the present invention. The computer-readable medium can be transportable such that the program stored thereon can be loaded onto any computer system resource to implement the aspects of the present invention discussed herein. In addition, it should be appreciated that the reference to a computer program which, when executed, performs the above-discussed functions, is not limited to an application program running on a host computer. Rather, the term computer program is used herein in a generic sense to reference any type of computer code (e.g., software or microcode) that can be employed to program a processor to implement the above-discussed aspects of the present invention.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and equivalents thereto.

What is claimed is:

1. A method of managing a data migration of a data set in a clustered computer system including at least first and second host computers and at least one storage system that stores the data set, the data set being shared by the first and second host computers, the at least one storage system providing a plurality of storage volumes to the first and second host computers to store the data set shared by the first and second host computers, the plurality of storage volumes including at least one first storage volume and at least one second storage volume, wherein the first and second host computers respectively have first and second agents associated therewith to manage the data migration, the method comprising an act of:

(A) prior to taking at least one action associated with beginning the data migration, coordinating between the first and second agents to ensure that the first and second host computers both are prepared to have the at least one action taken; and (B) not beginning the migration when it is determined in the act (A) that either of the first and second host computers is not prepared to have the migration begin;

wherein at least one transfer utility is used to migrate the data set from the at least one first storage volume to the at least one second storage volume by reading the data set from the at least one storage system that comprises the at least one first storage volume to at least one intermediate component and writing the data set from the at least one intermediate component to the at least one storage system that comprises the at least one second storage volume.

2. The method of claim 1, wherein the act (A) comprises acts of:

(A1) communicating to each of the first and second agents information identifying parameters for the migration, and (A2) verifying that the parameters are acceptable for each of the first and second host computers before beginning the migration.

3. The method of claim 2, wherein the act (A2) comprises an act of verifying that each of the first and second host computers has access to the at least one first storage volume and the at least one second storage volume.

4. The method of claim 2, wherein the act (A2) comprises an act of verifying that the at least one transfer utility is valid for transferring the data set from the at least one first storage volume to the at least one second storage volume in the clustered computer system.

5. The method of claim 1, is to perform a switch for at least one application program on the first and second host computers to switch the at least one application program from accessing one of the at least one first and second storage volumes to accessing the other of the at least one first and second storage volumes; and wherein the act (A) comprises an act of coordinating between the first and second agents to ensure that the first and second host computers both are prepared to perform the switch.

6. The method of claim 5, further comprising an act of initiating the switch.

7. The method of claim 1, wherein the act to be taken is to initialize a mirroring relationship between the at least one first and second storage volumes; and wherein the act (A) comprises an act of coordinating between the first and second agents to ensure that the first and second host computers both are prepared to initialize the mirroring relationship.

8. The method of claim 7, further comprising an act of initiating the mirroring relationship.

9. The method of claim 1, wherein the act (A) is performed prior to beginning the data migration, and wherein the at least one action to be taken is to lock the at least one first storage volume and the at least one second storage volume so that the at least one first and second storage volumes cannot be part of another migration while they are locked.

10. The method of claim 1, wherein the act (A) is performed prior to beginning the data migration, and wherein the at least one action to be taken is to block input/output operations from the second host computer to the at least one second storage volume.

11. The method of claim 1, further comprising an act of initiating the data migration.

12. The method of claim 1, wherein the at least one intermediate component comprises at least one of the at least first and second host computers so that the at least one transfer utility reads the data set from the at least one first storage volume to the at least one of the at least first and second host computers and writes the data set from the at least one of the at least first and second host computers to the at least one second storage volume.

13. The method of claim 1, wherein the at least one storage system is coupled to the at least first and second host computers via at least one interconnection device, and wherein the at least one intermediate component comprises the at least one interconnection device.

14. The method of claim 13, wherein the at least one interconnection device comprises a plurality of interconnection devices, and wherein the at least one intermediate component comprises a subset of the plurality of interconnection devices.

15. At least one computer readable medium encoded with instructions for execution on a clustered computer system including at least first and second host computers and at least one storage system that stores the data set, the data set being shared by the first and second host computers, the at least one storage system providing a plurality of storage volumes to the first and second host computers to store the data set shared by the first and second host computers, the plurality of storage volumes including at least one first storage volume and at least one second storage volume, wherein the first and second host computers respectively have first and second agents associated therewith, the instructions, when executed, perform a method of managing a data migration of a data set from the at least one first storage volume to the at least on second storage volume, the method comprising an act of:

(A) prior to taking at least one action associated with beginning the data migration, coordinating between the first and second agents to ensure that the first and second host computers both are prepared to have the at least one action taken; and (B) not beginning the migration when it is determined in the act (A) that either of the first and second host computers is not prepared to have the migration begin;

wherein at least one transfer utility is used to migrate the data set from the at least one first storage volume to the at least one second storage volume by reading the data set from the at least one storage system that comprises the at least one first storage volume to at least one intermediate component and writing the data set from the at least one intermediate component to the at least one storage system that comprises the at least one second storage volume.

16. The at least one computer readable medium of claim 15, wherein the act (A) comprises acts of:

(A1) communicating to each of the first and second agents information identifying parameters for the migration, and (A2) verifying that the parameters are acceptable for each of the first and second host computers before beginning the migration.

17. The at least one computer readable medium of claim 16, wherein the act (A2) comprises an act of verifying that each of the first and second host computers has access to the at least one first storage volume and the at least one second storage volume.

18. The at least one computer readable medium of claim 16, wherein the act (A2) comprises an act of verifying that the at least one transfer utility is valid for transferring the data set from the at least one first storage volume to the at least one second storage volume in the clustered computer system.

19. The at least one computer readable medium of claim 15, wherein the action to be taken is to perform a switch for at least one application program on the first and second host computers to switch the at least one application program from accessing one of the at least one first and second storage volumes to accessing the other of the at least one first and second storage volumes; and wherein the act (A) comprises an act of coordinating between the first and second agents to ensure that the first and second host computers both are prepared to perform the switch.

20. The at least one computer readable medium of claim 19, wherein the method further comprises an act of initiating the switch.

21. The at least one computer readable medium of claim 15, wherein the act to be taken is to initialize a mirroring relationship between the at least one first and second storage volumes; and wherein the act (A) comprises an act of coordinating between the first and second agents to ensure that the first and second host computers both are prepared to initialize the mirroring relationship.

22. The at least one computer readable medium of claim 21, wherein the method further comprises an act of initiating the mirroring relationship.

23. The at least one computer readable medium of claim 15, wherein the act (A) is performed prior to beginning the data migration, and wherein the at least one action to be taken is to lock the at least one first storage volume and the at least one second storage volume so that the at least one first and second storage volumes cannot be part of another migration while they are locked.

24. The at least one computer readable medium of claim 15, wherein the act (A) is performed prior to beginning the data migration, and wherein the at least one action to be taken is to block input/output operations from the second host computer to the at least one second storage volume.

25. The at least one computer readable medium of claim 15, wherein the method further comprises an act of initiating the data migration.

26. The at least one computer readable medium of claim 15, wherein the at least one intermediate component comprises at least one of the at least first and second host computers so that the at least one transfer utility reads the data set from the at least one first storage volume to the at least one of the at least first and second host computers and writes the data set from the at least one of the at least first and second host computers to the at least one second storage volume.

27. A first agent for use in a clustered computer system including at least first and second host computers and at least one storage system that stores the data set, the data set being shared by the first and second host computers, the at least one storage system providing a plurality of storage volumes to the first and second host computers to store the data set shared by the first and second host computers, the plurality of storage volumes including at least one first storage volume and at least one second storage volume, wherein the first agent is associated with the first host computer and the second host computer has a second agent associated therewith, the first agent for managing a data migration of a data set from the at least one first storage volume to the at least one second storage volume, the first agent comprising:

at least one processor that is programmed to, prior to taking at least one action associated with beginning the data migration, coordinate with the second agent to ensure that the second host computer is prepared to have the at least one action taken;

wherein the at least one processor is programmed to not begin the migration when it is determined as a result of the coordinating with the second agent that the second host computer is not prepared to have the migration begin; and wherein at least one transfer utility is used to migrate the data set from the at least one first storage volume to the at least one second storage volume by reading the data set from the at least one storage system that comprises the at least one first storage volume to at least one intermediate component and writing the data set from the at least one intermediate component to the at least one storage system that comprises the at least one second storage volume.

28. The first agent of claim 27, wherein the at least one processor is programmed to:

receive information identifying parameters for the migration, and verify that the parameters are acceptable for each of the first and second host computers before beginning the migration.

29. The first agent of claim 28, wherein the at least one processor is programmed to verify that each of the first and second host computers has access to the at least one first storage volume and the at least one second storage volume.

30. The first agent of claim 28, wherein the at least one processor is programmed to verify that the at least one transfer utility is valid for transferring the data set from the at least one first storage volume to the at least one second storage volume in the clustered computer system.

31. The first agent of claim 27, wherein the action to be taken is to perform a switch for at least one application program on the first and second host computers to switch the at least one application program from accessing one of the at least one first and second storage volumes to accessing the other of the at least one first and second storage volumes; and wherein the at least one processor is programmed to coordinate with the second agent to ensure that the second host computer is prepared to perform the switch.

32. The first agent of claim 31, wherein the at least one processor is programmed to initiate the switch.

33. The first agent of claim 27, wherein the act to be taken is to initialize a mirroring relationship between the at least one first and second storage volumes; and wherein the at least one processor is programmed to coordinate with the second agent to ensure that the second host computer is prepared to initialize the mirroring relationship.

34. The first agent of claim 33, wherein the at least one processor is programmed to initiate the mirroring relationship.

35. The first agent of claim 27, wherein the at least one processor is programmed to verify that the at least one first storage volume and the at least one second storage volume are locked before beginning the migration so that the at least one first and second storage volumes cannot be part of another migration while they are locked.

36. The first agent of claim 27, wherein the at least one processor is programmed to block input/output operations from the second host computer to the at least one second storage volume before beginning the migration.

37. The first agent of claim 27, wherein the at least one processor is programmed to initiate the data migration.

38. The first agent of claim 27, wherein the at least one intermediate component comprises at least one of the at least first and second host computers so that the at least one transfer utility reads the data set from the at least one first storage volume to the at least one of the at least first and second host computers and writes the data set from the at least one of the at least first and second host computers to the at least one second storage volume.

* * * * *